US012809663B2

(12) United States Patent
Prabhakar et al.

(10) Patent No.: US 12,809,663 B2
(45) Date of Patent: Nov. 24, 2026

(54) FINITE STATE MACHINE FOR CONTEXT SWITCHING IN A RECONFIGURABLE DATA PROCESSOR

(71) Applicant: SambaNova Systems, Inc., Palo Alto, CA (US)

(72) Inventors: Raghu Prabhakar, San Jose, CA (US); Ram Sivaramakrishnan, San Jose, CA (US); David Brian Jackson, Dana Point, CA (US); Pramod Nataraja, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 539 days.

(21) Appl. No.: 18/237,089

(22) Filed: Aug. 23, 2023

(65) Prior Publication Data

US 2024/0069959 A1 Feb. 29, 2024

Related U.S. Application Data

(60) Provisional application No. 63/400,404, filed on Aug. 24, 2022, provisional application No. 63/400,403,
(Continued)

(51) Int. Cl.
*G06F 9/48* (2006.01)
*G06F 3/06* (2006.01)
(Continued)

(52) U.S. Cl.
CPC .............. *G06F 9/485* (2013.01); *G06F 3/061* (2013.01); *G06F 3/0635* (2013.01);
(Continued)

(58) Field of Classification Search
CPC ........ G06F 9/485; G06F 3/061; G06F 3/0635; G06F 3/0673; G06F 9/4881;
(Continued)

(56) References Cited

U.S. PATENT DOCUMENTS 6,112,017 A 8/2000 Wise
6,282,627 B1 8/2001 Wong et al.
(Continued)

FOREIGN PATENT DOCUMENTS

WO 2010142987 A1 12/2010

OTHER PUBLICATIONS

Adriaansen et al., Code generation for reconfigurable explicit datapath architectures with LLVM, 2016, IEEE, pp. 30-37. (Year: 2016).
(Continued)

*Primary Examiner* — Peng Ke
(74) *Attorney, Agent, or Firm* — FP; Rutawari Sharma; Sikander M. Khan

(57) ABSTRACT

A system includes a coarse-grained reconfigurable (CGR) processor and a compiler configured to generate one or more configuration files for an application for execution on the CGR processor including an array of pattern compute units (PCUs) and pattern memory units (PMUs). A PCU is configured to perform an operation. A PMU includes operation-specific data related to the operation. The PMU is coupled to the PCU via a multi-segment datapath pipeline. The CGR processor is coupled to configure a segment of the datapath pipeline using a set of configurations bits corresponding to the operation-specific data to activate to the segment, to communicate the operation-specific data to the PCU via the activated segment. A finite state machine (FSM) is configured to progress through a plurality of states corresponding to the plurality of PMU contexts and allow the PMU to switch among multiple PMU contexts sequentially or concurrently.

8 Claims, 23 Drawing Sheets

Related U.S. Application Data filed on Aug. 24, 2022, provisional application No. 63/400,402, filed on Aug. 23, 2022.

(51) Int. Cl.
*G06F 12/02* (2006.01)
*G06F 15/80* (2006.01)

(52) U.S. Cl.
CPC .......... *G06F 3/0673* (2013.01); *G06F 9/4881* (2013.01); *G06F 12/0292* (2013.01); *G06F 15/8007* (2013.01); *G06F 2212/1016* (2013.01)

(58) Field of Classification Search
CPC ............. G06F 12/0292; G06F 15/8007; G06F 2212/1016; G06F 9/5016; G06F 2209/509; G06F 9/5066; G06F 15/7867; G06N 3/063
See application file for complete search history.

(56) References Cited

U.S. PATENT DOCUMENTS

| | | | |
|---|---|---|---|
| 9,348,792 | B2 | 5/2016 | Chung et al. |
| 10,467,183 | B2 | 11/2019 | Fleming et al. |
| 10,698,853 | B1 | 6/2020 | Grohoski et al. |
| 11,086,816 | B2 | 8/2021 | Fleming et al. |
| 11,200,096 | B1 | 12/2021 | Shenbagam et al. |
| 11,609,769 | B2 | 3/2023 | Shah et al. |
| 11,928,445 | B2 | 3/2024 | Prabhakar et al. |
| 12,061,793 | B1 * | 8/2024 | Musoll .............. H03M 13/2906 |
| 2002/0032558 | A1 | 3/2002 | Strong et al. |
| 2004/0243984 | A1 | 12/2004 | Vorbach et al. |
| 2014/0201579 | A1 * | 7/2014 | Arsovski ................ G11C 29/42 714/719 |
| 2014/0331031 | A1 | 11/2014 | Suh et al. |
| 2018/0248562 | A1 * | 8/2018 | Redfern .................. G06F 13/28 |
| 2019/0205244 | A1 | 7/2019 | Smith |
| 2020/0134308 | A1 * | 4/2020 | Javadi ................... G06F 40/284 |
| 2020/0356523 | A1 | 11/2020 | Prabhakar et al. |
| 2023/0002296 | A1 | 1/2023 | Prabhakar |
| 2023/0050383 | A1 | 2/2023 | Brewer |
| 2023/0095330 | A1 | 3/2023 | Lee et al. |
| 2025/0123881 | A1 * | 4/2025 | Sankaran ............ G06F 9/30036 |

OTHER PUBLICATIONS

Koeplinger et al., Spatial: A Language and Compiler for Application Accelerators, PLDI '18, Jun. 18-22, 2018, Association for Computng Machinery, 16 pages.
List of Related cases, dated Apr. 30, 2024, 2 pages.
Lopes et al., Coarse-Grained Reconfigurable Computing with the Versat Architecture, 2021, Electronics, 23 pages. (Year: 2021).
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.
Saluja, Register File Organization for Coarse-Grained Reconfigurable Architectures: Compiler-Microarchitecture Perspective, 2014, Master Thesis, Arizona State University, 38 pages. (Year: 2014).
U.S. Appl. No. 16/197,826—Notice of Allowance dated Jun. 29, 2020, 5 pages.
U.S. Appl. No. 16/239,252—Notice of Allowance dated May 14, 2020, 15 pages.
U.S. Appl. No. 16/407,675 Notice of Allowance dated Mar. 14, 2022, 12 pages.
U.S. Appl. No. 16/890,841, Notice of Allowance dt. Mar. 9, 2023, 32 pages.
U.S. Appl. No. 16/922,975—Notice of Allowance, dated Jul. 3, 2023, 11 pages.
U.S. Appl. No. 18/099,214—Notice of Allowance, dated Nov. 8, 2023, 7 pages.
Wan et al., A Coarse-Grained Reconfigurable Architecture with Compilation for High Performance, 2012, International Journal ofReconfigurable Computing, 17 pages. (Year: 2012).

* cited by examiner 700, 710

User Program Statements

```
Linear = torch.nn.linear(K,N)
Relu – torch.nn.relu
Softmax = torch.nn.Softmax(dim=3)
X1 = torch.randn(N, C, M, K)
X2 =%1.to("RDP")
X3 = Linear(X2)
X4 = Relu(X3)
X5 = Softmax(X4)
X6 = X5.to("CPU")
```

750

User Program Computation Graph

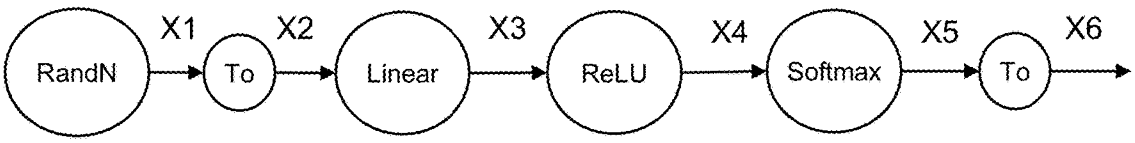

FIG. 7

800, 810

| Air/Tensor Statements | Tensor Size | |
|---|---|---|
| %1 = air.Input(name: "In0"): | NxCxMxK bf16 | |
| %2 = air.Linear(%1): | NxCxMxN bf16 | |
| %3 = air.ReLU(%2): | NxCxMxN bf16 | |
| %4 = air.Exp(%3): | NxCxMxN bf16 | Softmax Lowering |
| %5 = air.Sum(%4, dim: 3): | NxCxMx1 bf16 | |
| %6 = air.Div(%4, %5): | NxCxMxN bf16 | |
| %7 = air.Output(%6) | | |

850

Air/Tensor Computation Graph

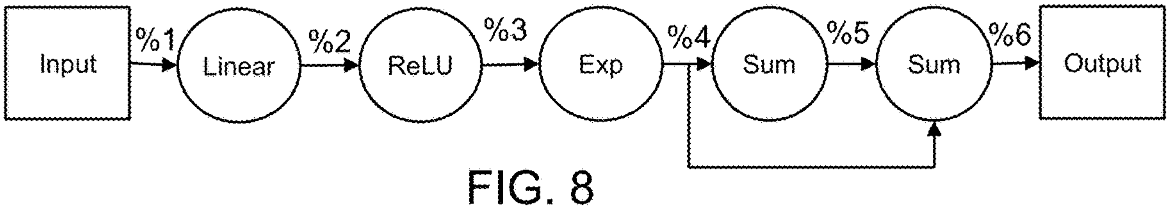

FIG. 8

900

| Template Dataflow Statements | Tensor Size |
| --- | --- |
| %1 = tlir.Region(name: "In0"): | NxCxMxK bf16 |
| %2 = tlir.Region(name: "Weight"): | KxN bf16 |
| %3 = tlir.Region(name: "Bias"): | 1xN bf16 |
| %4 = tlir.Region(name: "Out0"): | NxCxMxN bf16 |
| %5 = tlir.Load(%2) | |
| %6 = tlir.Load(%3) | |
| %7 = tlir.MetaPipeline(iters: N) { | |
|   %8 = tlir.Load(%1, dim: 1): | CxMxK bf16 |
|   %9 = tlir.Buffer(%5, depth: 2): | CxMxK bf16 |
|   %10 = tlir.MetaPipeline(iters: C) { | |
|     %11 = tlir.ReadSlice(%9, dim: 1): | MxK bf16 |
|     %12 = tlir.Linear(%5, %11): | MxN bf16 |
|     %13 = tlir.Buffer(%12, depth: 2): | MxN bf16 |
|     %14 = tlir.AddBias(%13, %6): | MxN bf16 |
|     %15 = air.ReLU(%14): | MxN bf16 |
|     %16 = air.Exp(%15): | MxN bf16 |
|     %17 = tlir.Buffer(%16, depth: 2): | MxN bf16 |
|     %18 = tlir.Sum(%17, dim: 1): | Mx1 bf16 |
|     %19 = tlir.Div(%17, %18): | MxN bf16 |
|     %20 = tlir.Store(%4, %19) | |
|   } | |
| } | |

910 (brackets %5 through the closing brace); 920 (brackets %7 through its closing brace)

950

Unstitched Template Computation Graph

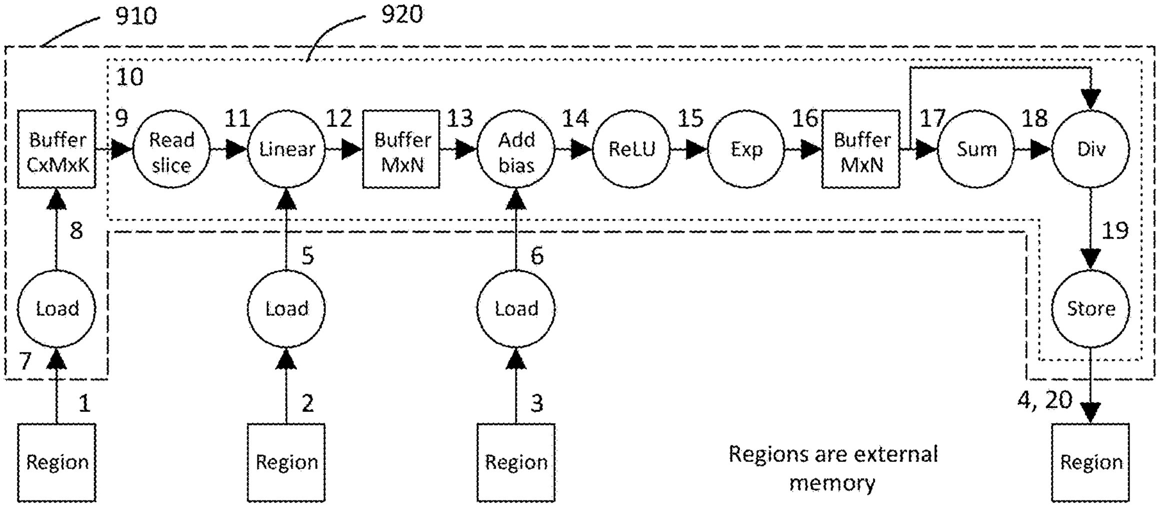

FIG. 9

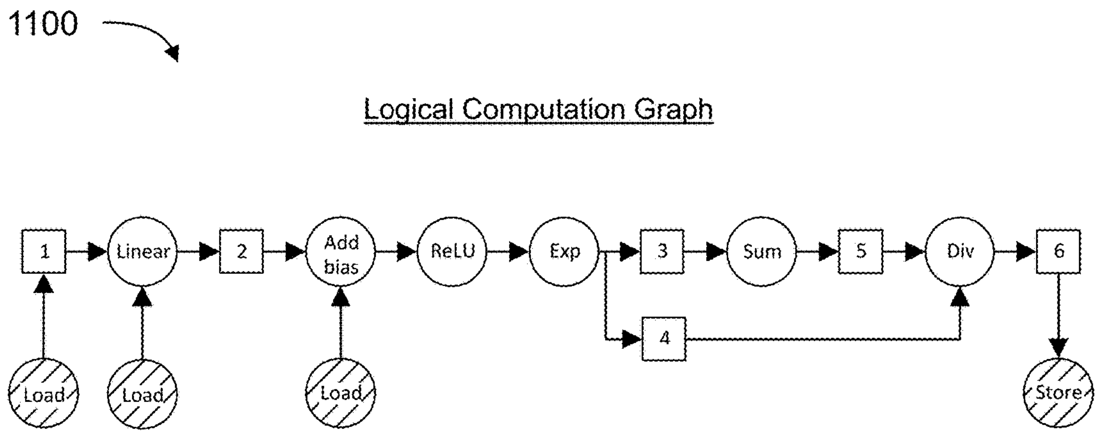
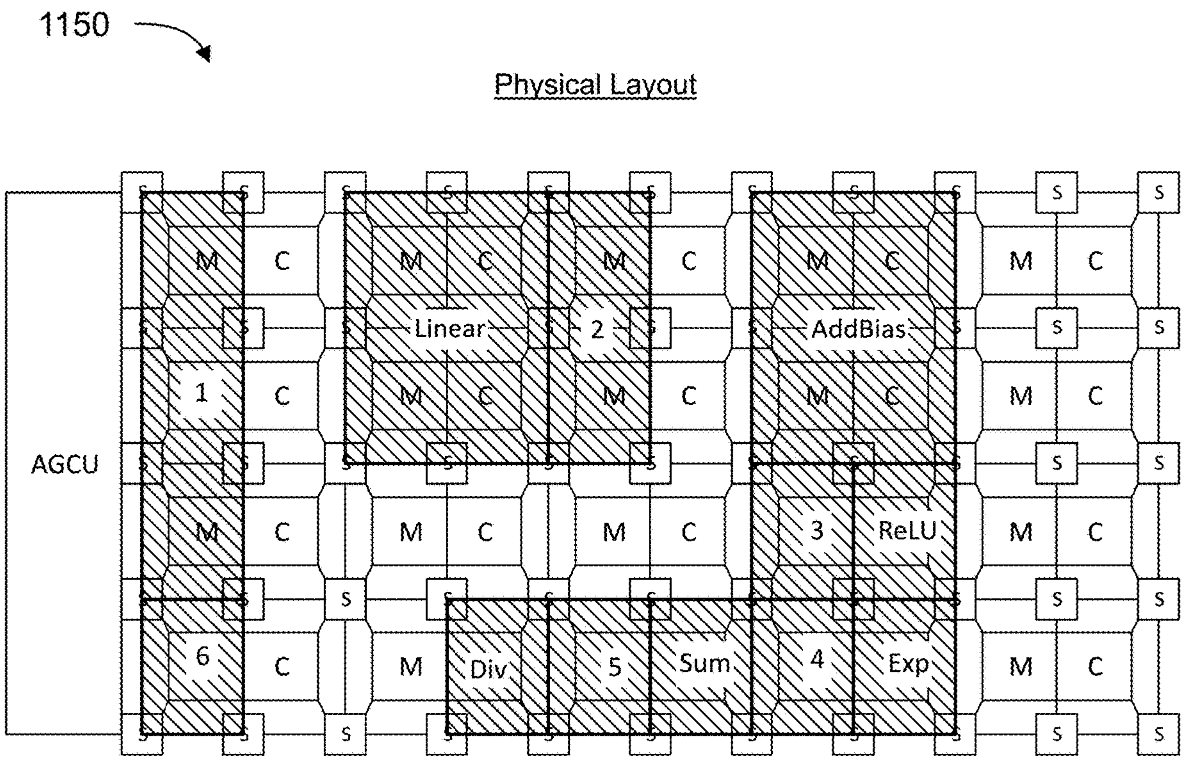
FIG. 11

FINITE STATE MACHINE FOR CONTEXT SWITCHING IN A RECONFIGURABLE DATA PROCESSOR

CROSS-REFERENCE TO RELATED APPLICATIONS

This application claims the benefit of U.S. Provisional Patent Application No. 63/400,402 entitled "MULTIPLE CONTEXTS FOR A PROGRAMMABLE COMPUTE UNIT IN A RECONFIGURABLE DATA PROCESSOR," filed Aug. 23, 2022; U.S. Provisional Patent Application No. 63/400,404 entitled "MULTIPLE CONTEXTS FOR A PROGRAMMABLE MEMORY UNIT IN A RECONFIGURABLE DATA PROCESSOR," filed Aug. 24, 2022; and U.S. Provisional Patent Application No. 63/400,403 entitled "CONTEXT SWITCHING IN A PROGRAMMABLE MEMORY UNIT IN A RECONFIGURABLE DATA PROCESSOR," filed Aug. 24, 2022; all of which are hereby incorporated by reference.

RELATED APPLICATION(S) AND DOCUMENTS

This application is related to the following papers and commonly owned applications:

- Prabhakar et al., "Plasticine: A Reconfigurable Architecture for Parallel Patterns," ISCA '17, Jun. 24-28, 2017, Toronto, ON, Canada;
- Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;
- U.S. Nonprovisional patent application Ser. No. 16/239,252, filed Jan. 3, 2019, now U.S. Pat. No. 10,698,853, entitled "VIRTUALIZATION OF A RECONFIGURABLE DATA PROCESSOR;"
- U.S. Nonprovisional patent application Ser. No. 16/197,826, filed Nov. 21, 2018, now U.S. Pat. No. 10,831,507, entitled "CONFIGURATION LOAD OF A RECONFIGURABLE DATA PROCESSOR;"
- U.S. Nonprovisional patent application Ser. No. 16/407,675, filed May 9, 2019, now U.S. Pat. No. 11,386,038, entitled "CONTROL FLOW BARRIER AND RECONFIGURABLE DATA PROCESSOR;"
- U.S. Nonprovisional patent application Ser. No. 16/890,841, filed Jun. 2, 2020, entitled "ANTI-CONGESTION FLOW CONTROL FOR RECONFIGURABLE PROCESSORS;"
- U.S. Nonprovisional patent application Ser. No. 16/922,975, filed Jul. 7, 2020, entitled "RUNTIME VIRTUALIZATION OF RECONFIGURABLE DATA FLOW RESOURCES;"
- U.S. Provisional Patent Application No. 63/236,218, filed Aug. 23, 2021, entitled "SWITCH FOR A RECONFIGURABLE DATAFLOW PROCESSOR."

All of the related application(s) and documents listed above are hereby incorporated by reference herein for all purposes.

BACKGROUND

The present subject matter relates to a configurable datapath in a pattern compute unit of in coarse-grained reconfigurable (CGR) processor to execute a dataflow graph.

Reconfigurable processors can be configured to implement a variety of functions more efficiently or faster than might be achieved using a general-purpose processor executing a computer program. For example, coarse-grained reconfigurable architectures (e.g., CGRAs) have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Configurable datapath pipeline can dramatically affect the performance of dataflow computing systems.

SUMMARY OF THE INVENTION

Disclosed herein, data processing system comprising a coarse-grained reconfigurable (CGR) processor including a plurality of pattern compute units (PCUs) and a plurality of pattern memory units (PMUs) configured to execute a dataflow graph, a PCU coupled to a PMU via a multi-segment datapath pipeline, the PCU coupled to receive a configuration file including PCU configuration data, the PMU coupled to receive the configuration file including PMU configuration data, and a finite state machine (FSM), wherein the PCU is coupled to configure a datapath including a plurality of functional units using the PCU configuration data for a plurality of to perform a task including a plurality of operations, wherein the PMU is coupled to configure, a plurality of fields in a segment of a multi-segment datapath pipeline corresponding to an operation using a PMU context including a set of configuration bits to activate a segment of the multi-segment datapath pipeline, wherein the PMU is coupled to switch the plurality of fields in the segment using a plurality of PMU contexts, and wherein the finite state machine (FSM) is configured to progress through a plurality of states corresponding to the plurality of PMU contexts, wherein the FSM can switch from one state to another state to allow the PMU switch between any two contexts in the segment sequentially, and wherein a plurality of FSMs corresponding to a plurality of segments can switch among a plurality states to allow switching of contexts in the plurality of segments concurrently.

Also disclosed herein, is a method for a coarse-grained reconfigurable (CGR) processor including an array of pattern compute units (PCUs) and pattern memory units (PMUs) configured to execute a dataflow graph, a PCU and a PMU coupled via a multi-segment datapath pipeline, the PMU comprising a plurality of data structures, and a finite state machine (FSM), the method comprising: receiving via a configuration file, PCU configuration data for the PCU, receiving via the configuration file, PMU configuration data for the PMU, configuring a datapath including a plurality of functional units in the PCU using the PCU configuration data to perform a task including a plurality of operations, configuring a plurality of fields in a segment of a multi-segment datapath pipeline corresponding to an operation using a PMU context including a set of configuration bits to activate the segment, switching the plurality of fields in the segment using a plurality of PMU contexts, configuring the FSM through a plurality of states corresponding to the plurality of PMU contexts, sequentially switching between any two PMU contexts in the segment by switching between their corresponding FSM states, and concurrently witching among a plurality of states for a plurality of FSMs corresponding to a plurality of segments to allow switching of PMU contexts in the plurality of segments.

Particular aspects of the technology disclosed are described in the claims, specification and drawings.

BRIEF DESCRIPTION OF THE DRAWINGS

The accompanying drawings, which are incorporated in and constitute part of the specification, illustrate various embodiments. Together with the general description, the drawings serve to explain various principles. In the drawings:

FIG. 7 shows an example implementation of an example user program in a first stage of a compiler stack.

FIG. 8 shows an example implementation of the example user program in a second stage of a compiler stack.

FIG. 9 shows an example implementation of the example user program in a third stage of a compiler stack.

FIG. 11 shows the logical computation graph and an example physical layout of the example user program.

Figure 1:
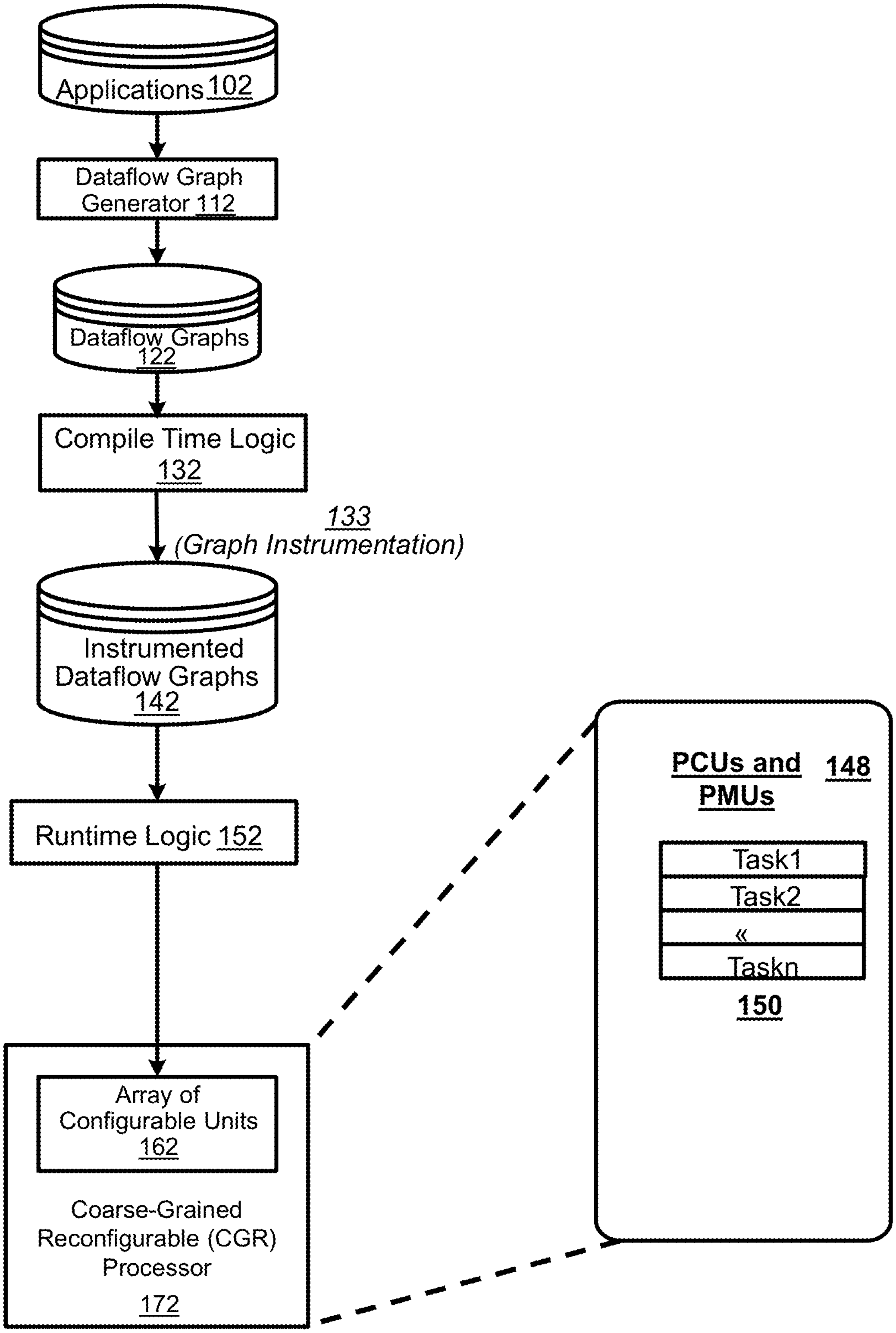
FIG. 1 illustrates an example of a data processing system that implements multiple tasks for a cross-grained reconfigurable processor (CGR) 172.

In the figures, like reference numbers may indicate functionally similar elements. The systems and methods illustrated in the figures, and described in the Detailed Description below, may be arranged and designed in a wide variety of different implementations. Neither the figures nor the Detailed Description are intended to limit the scope of the claims. Instead, they merely represent examples of different implementations of the disclosed technology.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

Embodiments of the present disclosure describe a PCU with multiple PCU contexts; meaning performing multiple tasks and configuring a datapath pipeline of functional units within the PCU in multiple ways corresponding to the tasks, for performing multiple tasks during execution of a dataflow graph by a CGR processor. In some examples, a PCU task can also be referred to as a "PCU context."

In one example, a single task can include a single operation such as a write or read operation, which can be considered as a single PCU context or requiring a single PCU context. When the PCU is performing multiple tasks, multiple operations are performed, which may be considered as PCU multiple contexts or require multiple contexts. In some examples, a single task can include multiple operations and therefore may require multiple contexts.

Additionally, disclosed herein is a PMU with multiple PMU contexts, meaning configuring a multi-segment (also known as "multi-stage") datapath pipeline between the PMU and the PCU such that any segment can handle its own pipeline independent of others for one or operations in a PCU task during execution of a dataflow graph. A PMU datapath pipeline may include multiple configuration fields pertaining to operations in a task, for example, a write operation or a read operation. In order to configure a stage of the PMU datapath pipeline for a particular operation, various fields (bits) in that stage may need to be configured. A set of configuration bits for one operation in one segment can be referred to as a PMU context. In one example, a single operation can require multiple sets of configuration bits, each known as a PMU context. In some examples, a single operation may require a single PMU context. It may be noted that a PMU can have one or more logical arrays, also known as "data structures." A single logical array is often written as, in other words may include the following: 1) Write: Initialization write from source A, repeated writes from source B, 2) Read: Conditional read (prints), 3) Read: Different access patterns such as normal, transposed, cropped, and 4) Read: Different read pointers. Furthermore, multiple arrays can be used for one or more of the following purposes: 1) Storing multiple weight arrays in same PMU for greater capacity utilization, 2) Reclaiming PMU to map multiple arrays over time, 3) Enable execution of large graphs, 4) Data vs. pipeline parallelism tradeoff for low latency vs. throughput. To summarize, a PCU task can include one or more operations to be performed and for each of those operations, the PMU can have multiple sets of configuration bits (contexts) spread over the multiple stages of the PMU's datapath pipeline, which activate the datapath between the PMU and the PCU for that operation. Advantageously, having multiple PMU contexts as explained above can further help with efficiency and capacity utilization of the PMUs in the CGR processor.

Furthermore, the disclosed technology relates to finite state machines which allow the PCU or PMU to transition through various PCU contexts or PMU contexts respectively, for performing tasks during execution of the dataflow graph. The following paragraphs will provide more explanation about PCU contexts, PMU contexts.

PCU Contexts in a dataflow graph—In systems with reconfigurable data processors, dataflow graphs (e.g., deep learning graphs) are compiled and translated into configuration bits files, which are loaded onto arrays of reconfigurable units (programmable compute units (PCUs) and programmable memory units (PMUs)). Each data graph may include various tasks to be performed. The tasks are loaded using configuration bit files. In a typical system, PCUs and PMUs are arranged in an alternating fashion. The PCUs execute the tasks, whereas the PMUs (which are memory arrays) provide pipelined data paths to the neighboring PCUs for the tasks to be performed. More particularly, before any task is performed, a specific PCU is first configured using the configuration bit files to perform that particular task. More specifically, many functional units in the PCU need to be configured using PCU context configuration data. In one example, a configured datapath to perform a particular task is known as a "PCU context." In some examples, a task, a configuration data for a datapath in the PCU, or a configured datapath in the PCU can be collectively or independently referred to as a "PCU context". Furthermore, in one example, in order to complete a single task, the PCU to perform a single write and two read operations.

PMU Contexts in a dataflow graph—Additionally, when the PCU is performing the task, the neighboring PMU's data path pipeline need to be configured to help the specific PCU to perform the specific task. The datapath pipeline may include several configuration fields for various operations (a single write and two read operations as explained above.) In scenarios where PCUs are executing multiple tasks or progressing through various PCU contexts while performing the tasks, PMU resources can be shared over time and/or space. In existing systems, the PMU data path pipeline includes a single segment with configuration bits programmed for predefined types and numbers of tasks to be performed. For example, the datapath pipeline may be configured for a single write and two read operations. So long as the PCU is performing the single write and the two read operations in the predefined order, the PMU's data path pipeline can function well. However, if a task is switched by the PCU in between (before performing the single write and two reads), then the PMU's entire data path pipeline needs to be reconfigured. In other words, for maximum flexibility, the PMU may need the ability to independently switch the various configurations write, read, and scratchpad configurations. Improvements are therefore needed to provide a configurable datapath pipeline for the PMU for allowing the PCU to switch tasks at any time. As will be explained, disclosed herein is multi-stage (or multi-segment) datapath pipeline for a PMU to provide flexibility in configuring each stage (segment) independently.

PMU Context States—In various PMU contexts, different groups of configuration bits may be known as configuration fields. For example, write configuration bits can be known as "write configuration fields," read configuration bits can be known as "read configuration fields," common configuration bits can be known as "common configuration fields," and more. The context state of a PMU can be defined as a union of such context fields. For example, in a particular PMU context, all these fields can have specific values and a union of all those values for that particular context can be referred to as a context state. As will be explained, disclosed are examples of finite state machines to switch from one context state to another.

1. Common (Config bits shared across all contexts: Counters, UDCs, controllers, Xbars),
2. Write A-C, X (Write configuration bits. A, B, C: contexts. X: Special 'unused' context),
3. Read0 A-C, X (Read0 configuration bits. A, B, C: contexts. X: Special 'unused' context),
4. Read1 A-C, (Read1 configuration bits. A, B, C: contexts. X: Special 'unused' context),
5. ScratchA-C(Scratchpad configuration—includes mode and address range checks),
6. OutO A-C—(Reado output configuration and credit management),
7. Out1 A-C(Read1 output configuration and credit management.).

Traditional compilers translate human-readable computer source code into machine code that can be executed on a Von Neumann computer architecture. In this architecture, a processor serially executes instructions in one or more threads of software code. The architecture is static, and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

As used herein, the phrase one of should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, and C" or the phrase "at least one of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object merely refers to different instances or classes of the object and does not imply any ranking or sequence.

The following terms or acronyms used herein are defined at least in part as follows:

AGCU—address generator (AG) and coalescing unit (CU).

AI—artificial intelligence.

AIR—arithmetic or algebraic intermediate representation.

ALN—array-level network.

Buffer—an intermediate storage of data.

CGR—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable. This term may be used alternatively with "RDU (reconfigurable dataflow unit)"

CGRA—coarse-grained reconfigurable architecture. A data processor architecture that includes one or more arrays (CGR arrays) of CGR units.

Compiler—a translator that processes statements written in a programming language to machine language instructions for a computer processor. A compiler may include multiple stages to operate in multiple steps. Each stage may create or update an intermediate representation (IR) of the translated statements. Compiler stages are illustrated with reference to FIG. 5.

Computation graph—some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

CGR unit—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

CU—coalescing unit.

Data Flow Graph—a computation graph that includes one or more loops that may be nested, and wherein nodes can send messages to nodes in earlier layers to control the dataflow between the layers.

Datapath—a collection of functional units that perform data processing operations. The functional units may include memory, multiplexers, ALUs, SIMDs, multipliers, registers, buses, etc.

FCMU—fused compute and memory unit—a circuit that includes both a memory unit and a compute unit.

Graph—a collection of nodes connected by edges. Nodes may represent various kinds of items or operations, dependent on the type of graph. Edges may represent relationships, directions, dependencies, etc.

IC—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in industry, produced by the same supply chains, and for the average user often indistinguishable from monolithic circuits.

A logical CGR array or logical CGR unit—a CGR array or a CGR unit that is physically realizable, but that may not have been assigned to a physical CGR array or to a physical CGR unit on an IC.

ML—machine learning.

PCU—pattern compute unit—a compute unit that can be configured to perform one or more operations.

PCU context—A datapath configured for functional units in a PCU to perform one or more operations in a task. The datapath is configured using PCU context configuration data present in the configuration file. In some examples, a PCU task is also known as a PCU context.

PEF—processor-executable format—a file format suitable for configuring a configurable data processor.

Pipeline—a staggered flow of operations through a chain of pipeline stages. The operations may be executed in parallel and in a time-sliced fashion. Pipelining increases overall instruction throughput. CGR processors may include pipelines at different levels. For example, a compute unit may include a pipeline at the gate level to enable correct timing of gate-level operations in a synchronous logic implementation of the compute unit, and a meta-pipeline at the graph execution level to enable correct timing of node-level operations of the configured graph. Gate-level pipelines are usually hard wired and unchangeable, whereas meta-pipelines are configured at the CGR processor, CGR array level, and/or GCR unit level.

Pipeline Stages—a pipeline is divided into stages that are coupled with one another to form a pipe topology.

PMU—pattern memory unit—a memory unit that can locally store data.

PMU context—A segment of a multi-segment datapath pipeline configured for an operation included in a PCU task. The segment is configured using PMU configuration data present in the configuration file.

PNR—place and route—the assignment of logical CGR units and associated processing/operations to physical CGR units in an array, and the configuration of communication paths between the physical CGR units.

RAIL—reconfigurable dataflow unit (RDU) abstract intermediate language.

CGR Array—an array of CGR units, coupled with each other through an array-level network (ALN), and coupled with external elements via a top-level network (TLN). A CGR array can physically implement the nodes and edges of a dataflow graph and is sometimes referred to as a reconfigurable dataflow unit (RDU).

SIMD—single-instruction multiple-data—an arithmetic logic unit (ALU) that simultaneously performs a single programmable operation on multiple data elements delivering multiple output results.

TLIR—template library intermediate representation.

TLN—top-level network.

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler, see, for example, FIGS. 6-11. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a computation graph or dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

As explained earlier, in a CGR processor, it can be advantageous to have flexibility to configure the PCU datapath or PMU datapath pipeline and further switch those as required by the operations in a task at any time.

FIG. 1 depicts a data processing system that implements the disclosed multiple tasks (contexts) for a CGR processor 172. A dataflow graph generator 112 processes applications 102 and generates dataflow graphs 122. Compile time logic 132 (compiler) instruments the dataflow graphs 122 and generates instrumented dataflow graphs 142. Instrumentation 133 by the compile time logic 132 can include analyzing the dataflow graphs 122 and determining progress milestones (or execution boundaries) for operations in the dataflow graphs 122. A progress milestone can be set on a per-loop basis to correspond to entry and exit points of loops. Alternatively, a progress milestone can be set for multiple loops in the dataflow graphs 122. Instrumentation 133 by the compile time logic 132 can further include assigning a timeout period to each progress milestone. The timeout period can correspond to how long (e.g., how many clock cycles) it takes to execute the operations grouped into a progress milestone. In some implementations, the timeout period can vary from progress milestone-to-progress milestone, for example, depending on the number of instructions (e.g., FLOPS) required to execute the operations grouped into a progress milestone. In other implementations, a common timeout period can be assigned to some or all progress milestones. Instrumentation 133 by the compile time logic 132 can further include inserting control signal triggers (e.g., control flow assertion checks like CHECK instructions (e.g., CHECK LOOP start or CHECK LOOP End)) in the dataflow graphs 122 to specify the progress milestones. A control signal is triggered upon completion of a corresponding progress milestone. The instrumented dataflow graphs 142 are application binary with configuration data generated by the compile time logic 132 for the dataflow graphs 122. The configuration data defines the progress milestones 143, the corresponding control signal triggers 144, and the corresponding timeout periods 145.

A runtime logic 152 loads the instrumented dataflow graphs 142 onto an array of configurable units 162 of a reconfigurable data processor 172 for execution. The runtime logic 152 uses the configuration data to configure and reconfigure configurable units in the array of configurable units 162. The array of reconfigurable units includes PCUs and PMUs 148, which are operatively coupled to implement multiple tasks task1, task2, up to taskN 150 using a single configuration bit file, according to an embodiment of the present disclosure. The details of the implementation of multiple tasks 150 will be explained later in the specification.

Figure 1A:
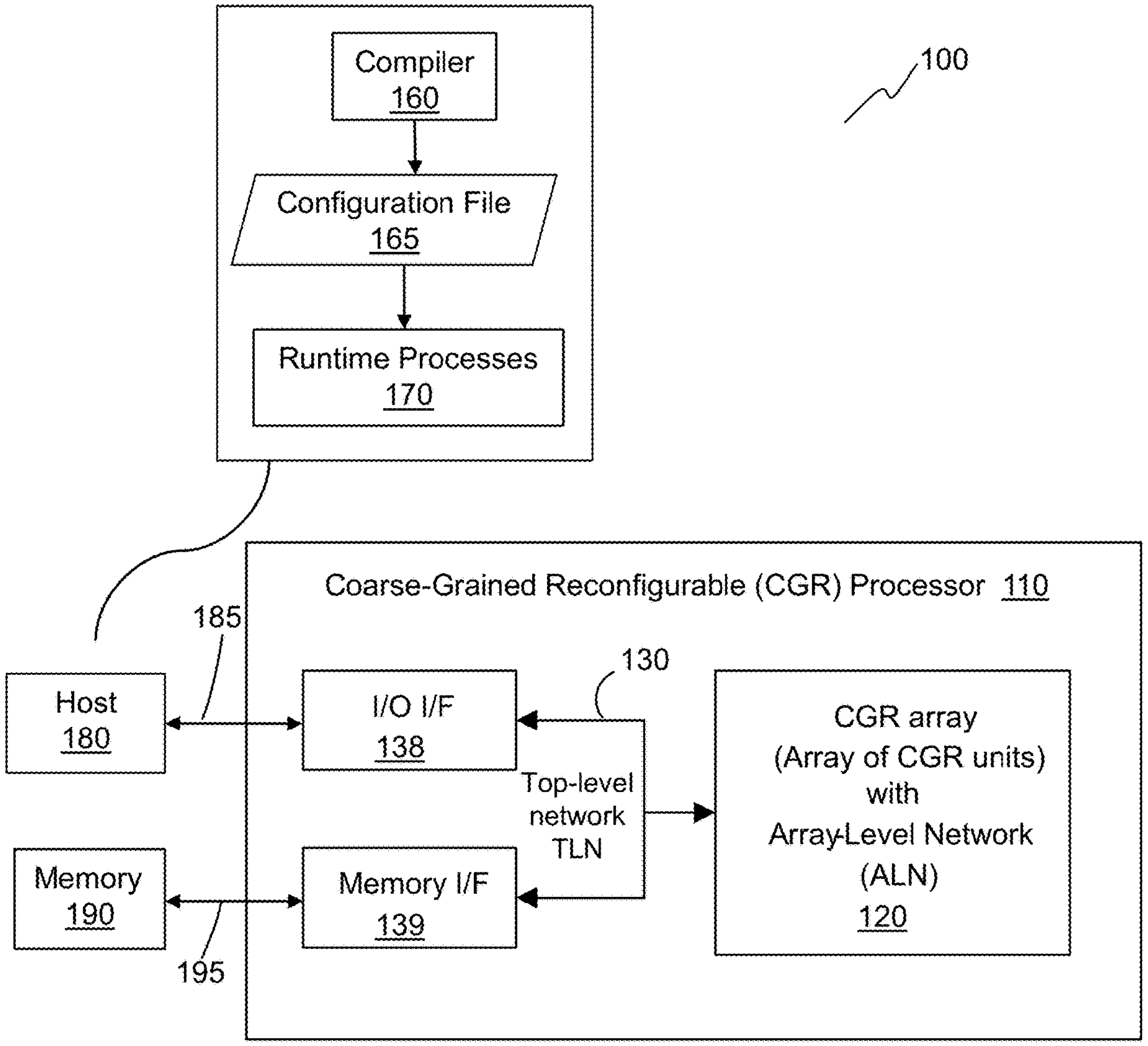
FIG. 1A is a system diagram illustrating a system including a host, a memory, and a reconfigurable data processor.

FIG. 1A illustrates an example system 100 including a CGR processor 110, a host 180, and a memory 190. The CGR processor 110 can be one example of the CGR processor 172 shown in FIG. 1. The CGR processor 110 has a coarse-grained reconfigurable architecture (CGRA) and includes an array of CGR units 120 such as a CGR array. CGR processor 110 further includes an IO interface 138, and a memory interface 139. The array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be or can include a computer such as further described with reference to FIG. 2. Host 180 runs runtime 170, as further referenced herein, and may also be used to run computer programs, such as the compiler 160, further described herein with reference to FIG. 6. In some implementations, the compiler may run on a computer that is similar to the computer described with reference to FIG. 2 but separate from host 180.

CGR processor 110 may accomplish computational tasks by executing a configuration file 165. For the purposes of this description, a configuration file corresponds to a dataflow graph, or a translation of a dataflow graph, and may further include initialization data. A compiler 160 compiles the high-level program to provide the configuration file 165. In some implementations described herein, a CGR array is configured by programming one or more configuration stores with all or parts of the configuration file 165. A single configuration store may be at the level of the CGR processor or the CGR array, or a CGR unit may include an individual configuration store. The configuration file may include configuration data for the CGR array and CGR units in the CGR array and link the computation graph to the CGR array. Execution of the configuration file 165 by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

FIG. 1A illustrates an example system 100 including a CGR processor 110, a host 180, and a memory 190. CGR processor 110 has a coarse-grained reconfigurable architecture (CGRA) and includes an array of CGR units 120 such as a CGR array. CGR processor 110 further includes an IO interface 138, and a memory interface 139. The array of CGR units 120 is coupled with IO interface 138 and memory interface 139 via databus 130 which may be part of a top-level network (TLN). Host 180 communicates with IO interface 138 via system databus 185, and memory interface 139 communicates with memory 190 via memory bus 195. Array of CGR units 120 may further include compute units and memory units that are connected with an array-level network (ALN) to provide the circuitry for execution of a computation graph or a dataflow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph(s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be or can include a computer such as further described with reference to FIG. 2. Host 180 runs runtime 170, as further referenced herein, and may also be used to run computer programs, such as the compiler 160, further described herein with reference to FIG. 6. In some implementations, the compiler may run on a computer that is similar to the computer described with reference to FIG. 2 but separate from host 180.

CGR processor 110 may accomplish computational tasks by executing a configuration file 165. For the purposes of this description, a configuration file corresponds to a dataflow graph, or a translation of a dataflow graph, and may further include initialization data. A compiler 160 compiles the high-level program to provide the configuration file 165. In some implementations described herein, a CGR array is configured by programming one or more configuration stores with all or parts of the configuration file 165. A single configuration store may be at the level of the CGR processor or the CGR array, or a CGR unit may include an individual configuration store. The configuration file may include configuration data for the CGR array and CGR units in the CGR array and link the computation graph to the CGR array. Execution of the configuration file 165 by CGR processor 110 causes the CGR array (s) to implement the user algorithms and functions in the dataflow graph.

CGR processor 110 can be implemented on a single integrated circuit die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
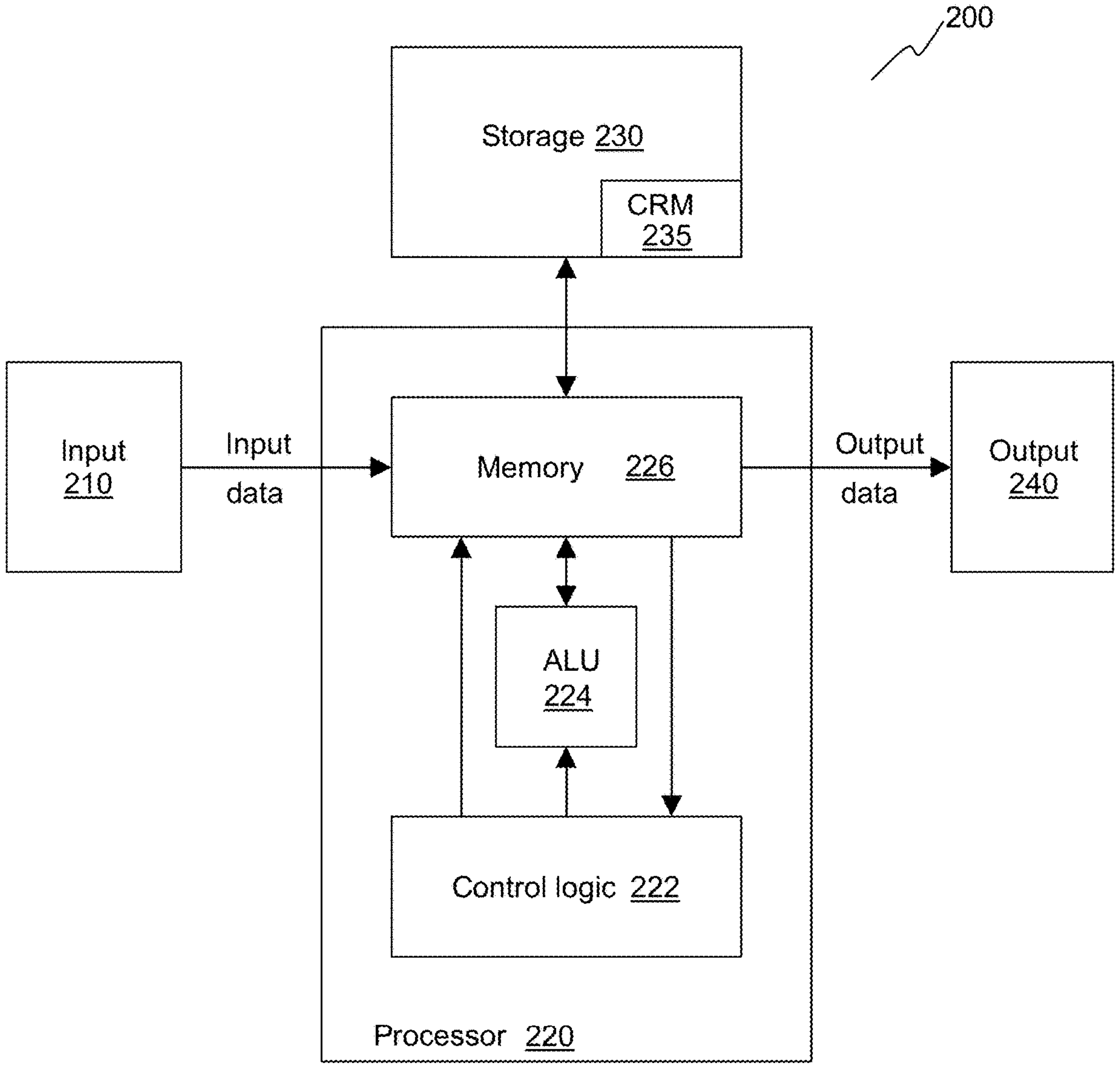
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) interface suitable for communicating with CGR processor 110. Input device 210 is coupled with processor 220 to provide input data, which in an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
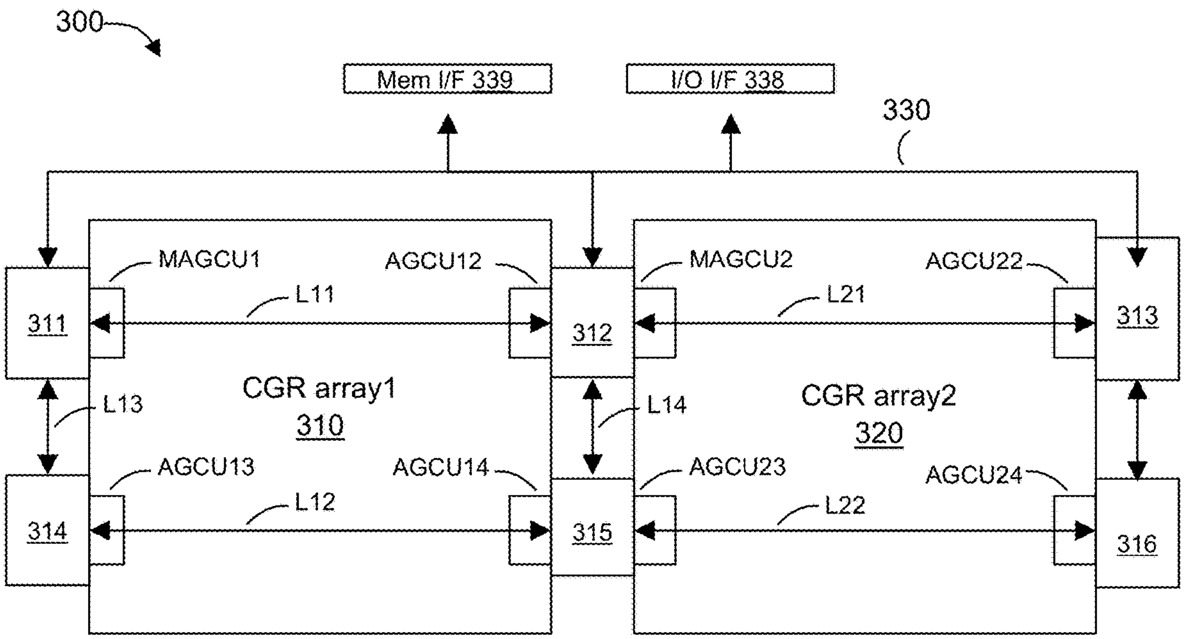
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array1 310 and CGR array2 320). The CGR arrays may also be referred to as "tiles." As such, the CGR array1 310 may be referred to as "tile1 310" and the CGR array2 320 may be referred to as "tile2 320."

A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN and external devices, such as high-capacity memory, host processors, other CGR processors, FPGA devices, and so on, that are coupled with the interfaces.

Each depicted CGR array has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
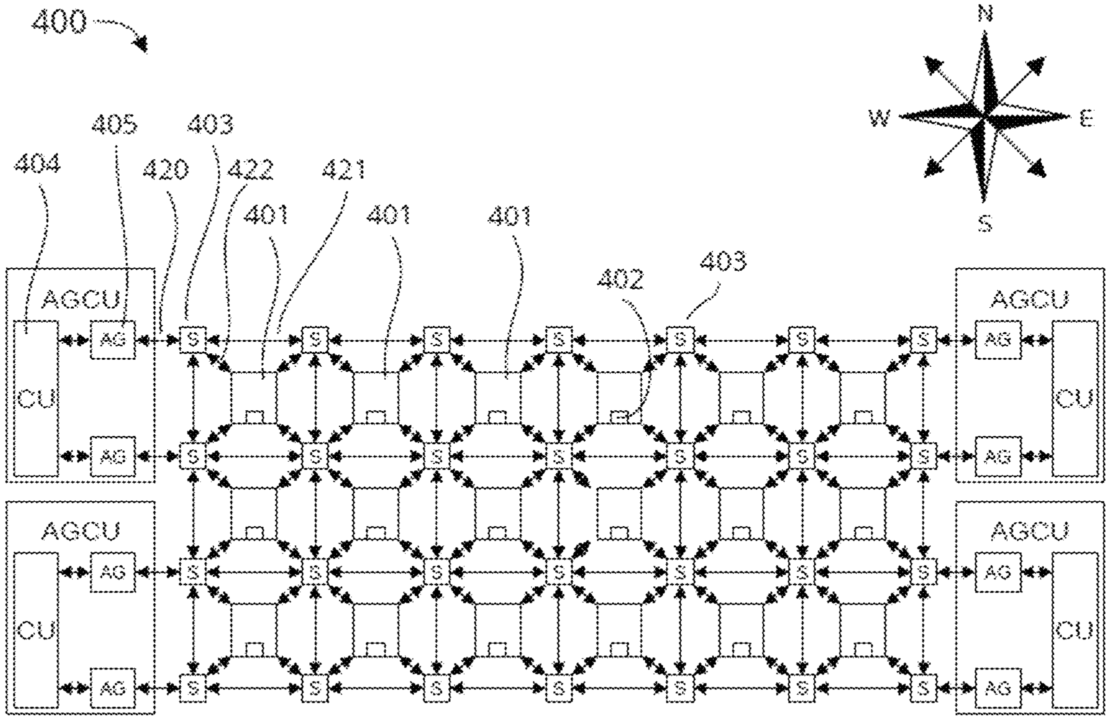
FIG. 4 illustrates an example CGR array, including an array of configurable nodes in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada. Each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 21 and to a CGR unit 401 with interconnects 422. Switch units 403 may be coupled with the address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Program load is the process of setting up the configuration stores in the CGR array based on the configuration data to allow the CGR units to execute the high-level program. Program load may also require loading memory units and/or PMUs.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in the example of FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces. More details about the FIG. 4 are described in the related U.S. Nonprovisional patent application Ser. No. 16/239,252, filed Jan. 3, 2019, now U.S. Pat. No. 10,698,853, entitled "VIRTUALIZATION OF A RECONFIGURABLE DATA PROCESSOR."

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 4A:
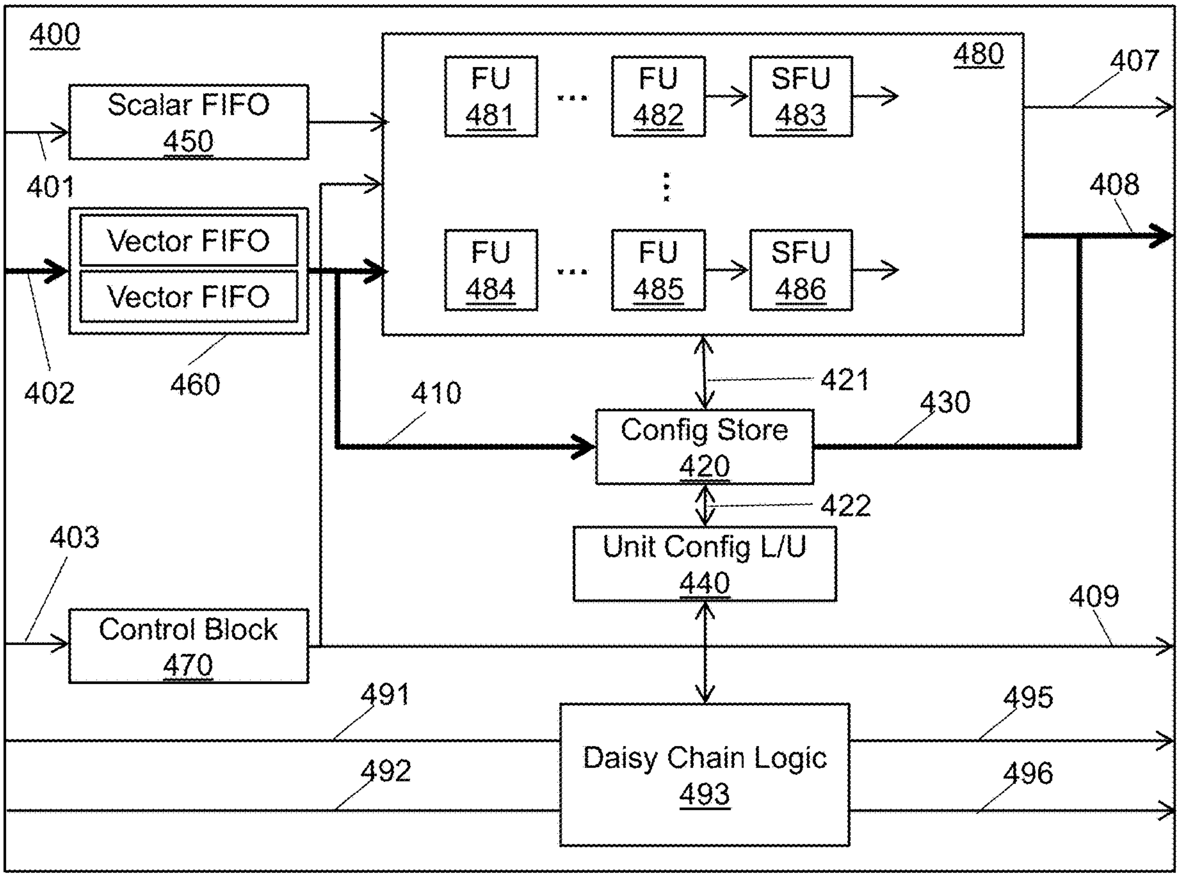
FIG. 4A is a block diagram illustrating an example configurable compute unit.

FIG. 4A is a block diagram illustrating an example configurable unit 401, such as a Pattern Compute Unit (PCU). A configurable unit can interface with the scalar, vector, and control buses, in this example using three corresponding sets of inputs and outputs: scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 470, and control outputs are provided by the control block 470.

Each vector input is buffered in this example using a vector FIFO in a vector FIFO block 460 which can include one or more vector FIFOs. Likewise in this example, each scalar input is buffered using a scalar FIFO 455. Using input FIFOs decouples timing between data producers and consumers and simplifies inter-configurable-unit control logic by making it robust to input delay mismatches.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 425 is connected to the multiple datapaths in block 480 via line 435.

A configurable datapath organized as a multi-stage pipeline can include multiple functional units (e.g., 481, 482, 483; 484, 485, 486) at respective stages. A special functional unit SFU (e.g., 483, 486) in a configurable datapath can include a configurable module 487 that comprises sigmoid circuits and other specialized computational circuits, the combinations of which can be optimized for particular implementations. In one embodiment, a special functional unit can be at the last stage of a multi-stage pipeline and can be configured to receive an input line X from a functional unit (e.g., 482, 486) at a previous stage in a multi-stage pipeline. In some embodiments, a configurable unit like a PCU can include many sigmoid circuits, or many special functional units which are configured for use in a particular graph using configuration data.

Configurable units in the array of configurable units include configuration data stores 425 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 425 via line 461, to execute a unit configuration load process. The unit configuration load process includes receiving, via the bus system (e.g., the vector inputs), chunks of a unit file particular to the configurable unit and loading the received chunks into the configuration data store 425 of the configurable unit. The unit file loaded into the configuration data store 425 can include configuration data, including opcodes and routing configuration, for circuits implementing a matrix multiply as described with reference to FIGS. 6-12.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 410 can be provided to a vector FIFO as vector inputs, and then be transferred to the configuration data store 425. Output configuration data 430 can be unloaded from the configuration data store 425 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 4, a daisy-chained completion bus 491 and a daisy-chained command bus 492 are connected to daisy-chain logic 493, which communicates with the unit configuration load logic 440. The daisy-chain logic 493 can include load complete status logic, as described below. The daisy-chained completion bus is further described below. Other topologies for the command and completion buses are clearly possible but not described here.

Figure 5:
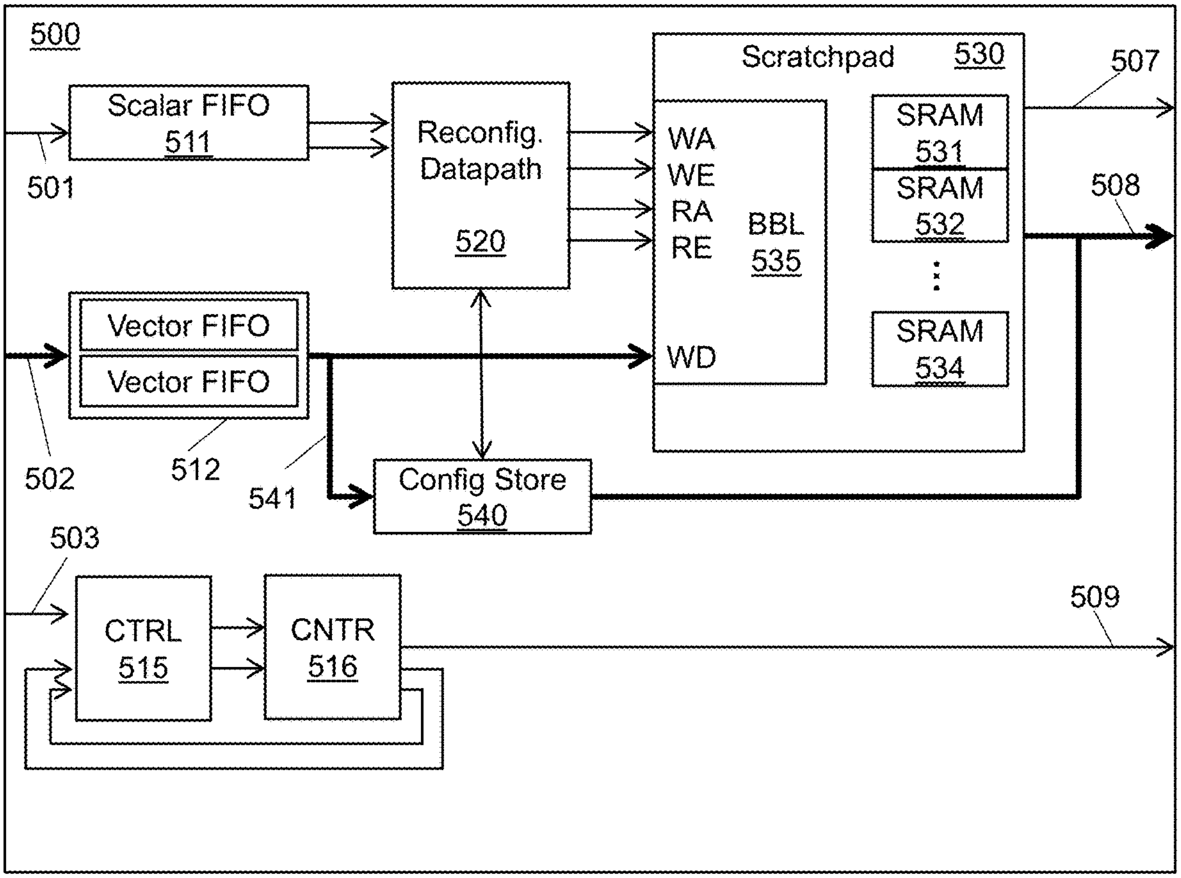
FIG. 5 is a block diagram illustrating an example configurable memory unit.
Figure 18:
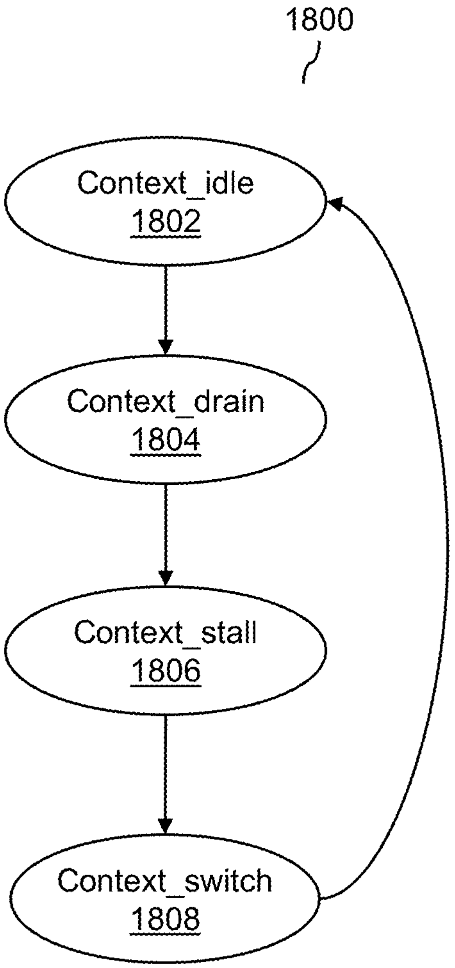
FIG. 18 illustrates an example of an FSM transitioning through multiple states for corresponding various PMU contexts, according to an embodiment of the present disclosure.

FIG. 5 is a block diagram illustrating an example configurable pattern memory unit (PMU) including an instrumentation logic unit. A PMU can contain scratchpad memory 530 coupled with a reconfigurable scalar data path 520 intended for address calculation (RA, WA) and control (WE, RE) of the scratchpad memory 530, along with the bus interfaces used in the PCU (FIG. 18). PMUs can be used to distribute on-chip memory throughout the array of reconfigurable units. In one embodiment, address calculation within the memory in the PMUs is performed on the PMU datapath, while the core computation is performed within the PCU.

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a lookup table stored in the scratchpad memory 530, from a configuration file or from other sources. In a computation unit as described herein, the reconfigurable scalar data path 520 can translate a section of a raw input value I for addressing lookup tables implementing a function $f(I)$, into the addressing format utilized by the scratchpad memory 530, adding appropriate offsets and so on, to read the entries of the lookup table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 519 and external control inputs, the control block 515 can be configured to trigger the write address computation, read address computation, or both, by enabling the appropriate counters 516. More specifically, the counters 516, which can be a programmable counter chain 516 (Control Inputs, Control Outputs,) and control block 515 can trigger PMU execution.

Instrumentation logic 518 is included in this example of a configurable unit. The instrumentation logic 518 can be part of the control block 515 or implemented as a separate block on the device. The instrumentation logic 518 is coupled to the control inputs and to the control outputs. Also, the instrumentation logic 518 is coupled to the control block 515 and the counter chain 516, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 5A:
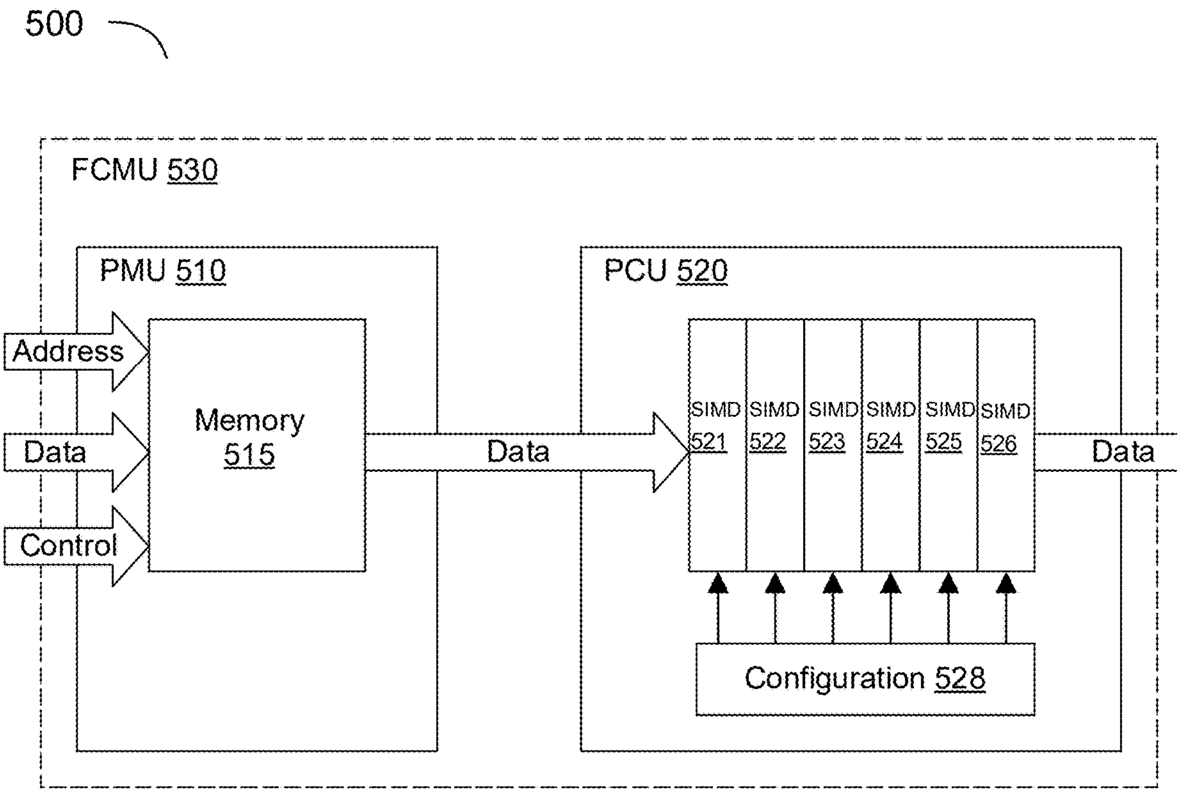
FIG. 5A illustrates an example of a pattern memory unit (PMU) and a pattern compute unit (PCU), which may be combined in a fused-control memory unit (FCMU).

FIG. 5A illustrates an example 500 of a PMU 550 and a PCU 560, which may be combined in an FCMU 540. PMU 550 may be directly coupled to PCU 560, or optionally via one or more switches. PMU 550 includes a scratchpad memory 530, which may receive external data, memory addresses, and memory control information (write enable, read enable) via one or more buses included in the ALN. PCU 560 includes two or more processor stages, such as SIMD 521 through SIMD 526, and configuration store 528. The processor stages may include ALUs, or SIMDs, as drawn, or any other reconfigurable stages that can process data.

Each stage in PCU 560 may also hold one or more registers (not drawn) for short-term storage of parameters. Short-term storage, for example during one to several clock cycles or unit delays, allows for synchronization of data in the PCU pipeline.

Figure 6:
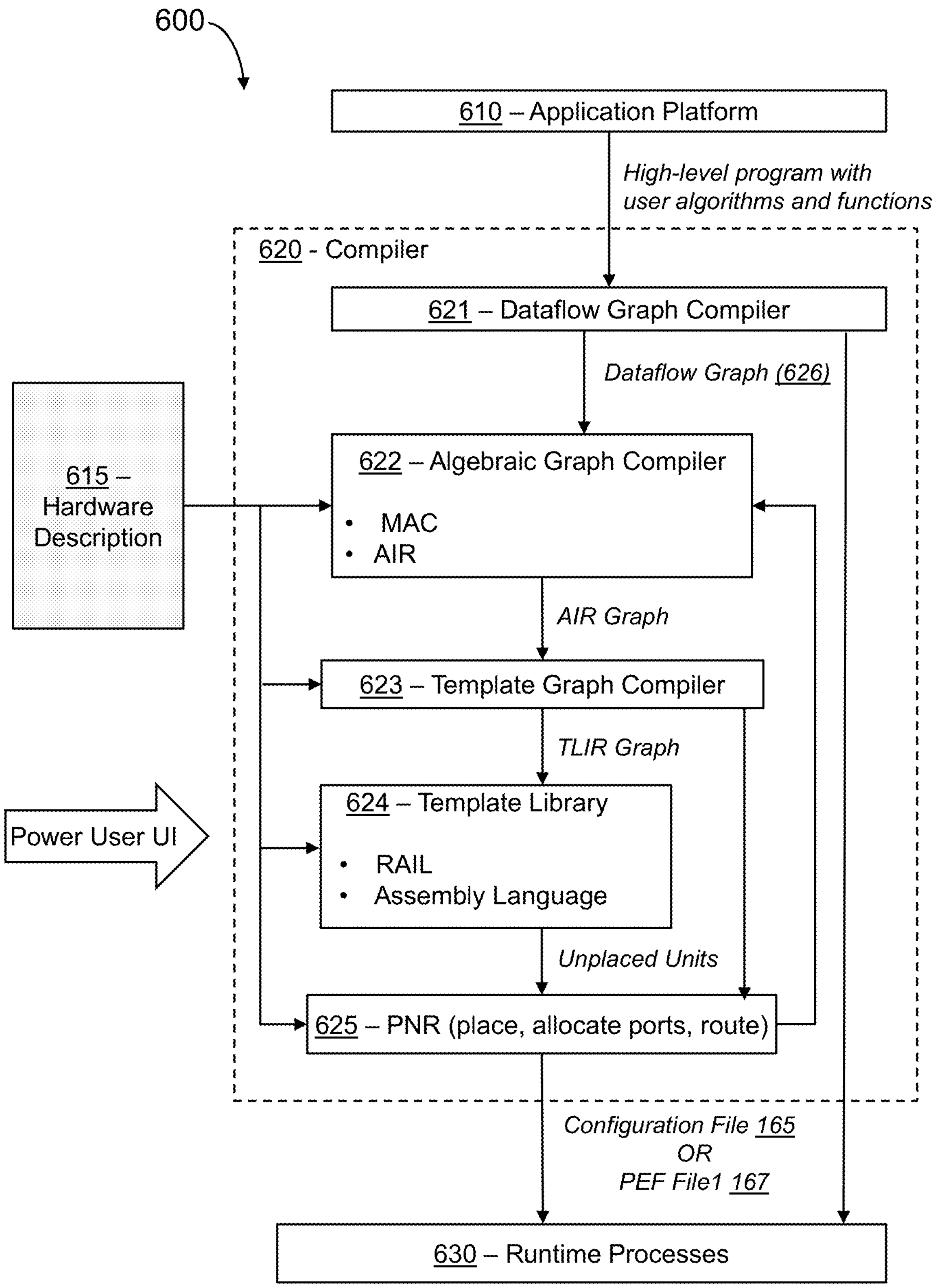
FIG. 6 is a block diagram of a compiler stack implementation suitable for generating a configuration file for a CGR processor.

FIG. 6 is a block diagram of a compiler stack 600 implementation suitable for generating a configuration file for a CGR processor. FIGS. 7-11 illustrate various representations of an example user program 700 corresponding to various stages of a compiler stack such as compiler stack 600. As depicted, compiler stack 600 includes several stages to convert a high-level program (e.g., user program 700) with statements 710 that define user algorithms and functions, e.g., algebraic expressions and functions, to configuration data for the CGR units.

Compiler stack 600 may take its input from application platform 610, or any other source of high-level program statements suitable for parallel processing, which provides a user interface for general users. It may further receive hardware description 615, for example defining the physical units in a reconfigurable data processor or CGRA processor. Application platform 610 may include libraries such as PyTorch, TensorFlow, ONNX, Caffe, and Keras to provide user-selected and configured algorithms. The example user program 700 depicted in FIG. 7 comprises statements 710 that invoke various PyTorch functions.

FIG. 7 shows an example implementation of an example user program 700 in a first stage of a compiler stack. The example user program 700 generates a random tensor X1 with a normal distribution in the RandN node. It provides then tensor to a neural network cell that performs a weighing function (in the Linear node) followed by a rectified linear unit (ReLU) activation function, which is followed by a Softmax activation function, for example to normalize the output to a probability distribution over a predicted output class. FIG. 7 does not show the weights and bias used for the weighing function.

Application platform 610 outputs a high-level program to compiler 620 (which is an example of the compiler 160 shown in FIG. 1,) which in turn outputs a configuration file to the reconfigurable data processor or CGRA processor where it is executed in runtime 630. The runtime 630 can be an example of the runtime 170 shown in FIG. 1. Compiler 620 may include dataflow graph compiler 621, which may handle a dataflow graph, algebraic graph compiler 622, template graph compiler 623, template library 624, and placer and router PNR 625. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program. Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610.

Algebraic graph compiler 622 may include a model analyzer and compiler (MAC) layer that makes high-level mapping decisions for (sub-graphs of the) dataflow graph based on hardware constraints. It may support various application frontends such as Samba, JAX, and TensorFlow/

HLO. Algebraic graph compiler 622 may also transform the graphs by automatically generating gradient computing graphs, perform stitching between sub-graphs, for performance and latency estimation, convert dataflow graph operations to AIR operation, perform tiling, sharding (database partitioning) and other operations, and model the parallelism that can be achieved on the dataflow graphs.

Algebraic graph compiler 622 may further include an arithmetic or algebraic intermediate representation (AIR) level that translates high-level graph and mapping decisions provided by the MAC layer into explicit AIR graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput. The AIR layer constructs pipelines based on MAC mapping decisions by placing operations into a metapipe and inserting stage buffers between them. It may also insert AllReduce instructions for collecting results from parallelized operations. It may also further optimize by redundant operation and dead code elimination, pipeline collapsing, and operation fusion.

FIG. 8 shows an example implementation of user program 700 in the second stage of the compiler stack. At this stage, the algebraic graph compiler replaces the Softmax macro by its constituents. The Softmax function is given as $$\frac{e^{\{z_i\}}}{\Sigma_{j=1}^{K} e^{\{z_j\}}}.$$

This function includes an exponential component, a summation, and a division. Thus, algebraic graph compiler 622 replaces the user program statements 710, also shown as computation graph 750, by AIR/Tensor statements 800, also shown as Air/Tensor computation graph 850.

Template graph compiler 623 may translate AIR statements and/or graphs into TLIR statements 900 (see FIG. 9) and/or graphs (graph 950 is shown), optimizing for the target hardware architecture into unplaced variable-sized units (referred to as logical CGR units) suitable for PNR 625. Template graph compiler 623 may allocate meta-pipelines, such as meta-pipeline 910 and meta-pipeline 920, for sections of the template dataflow statements 900 and corresponding sections of unstitched template computation graph 950. Template graph compiler 623 may add further information (name, inputs, input names and dataflow description) for PNR 625 and make the graph physically realizable through each performed step. Template graph compiler 623 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Template library 624 provides templates for commonly used operations, for example GEMM. Templates are implemented using assembly language. Templates are further compiled by an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

Figure 10:
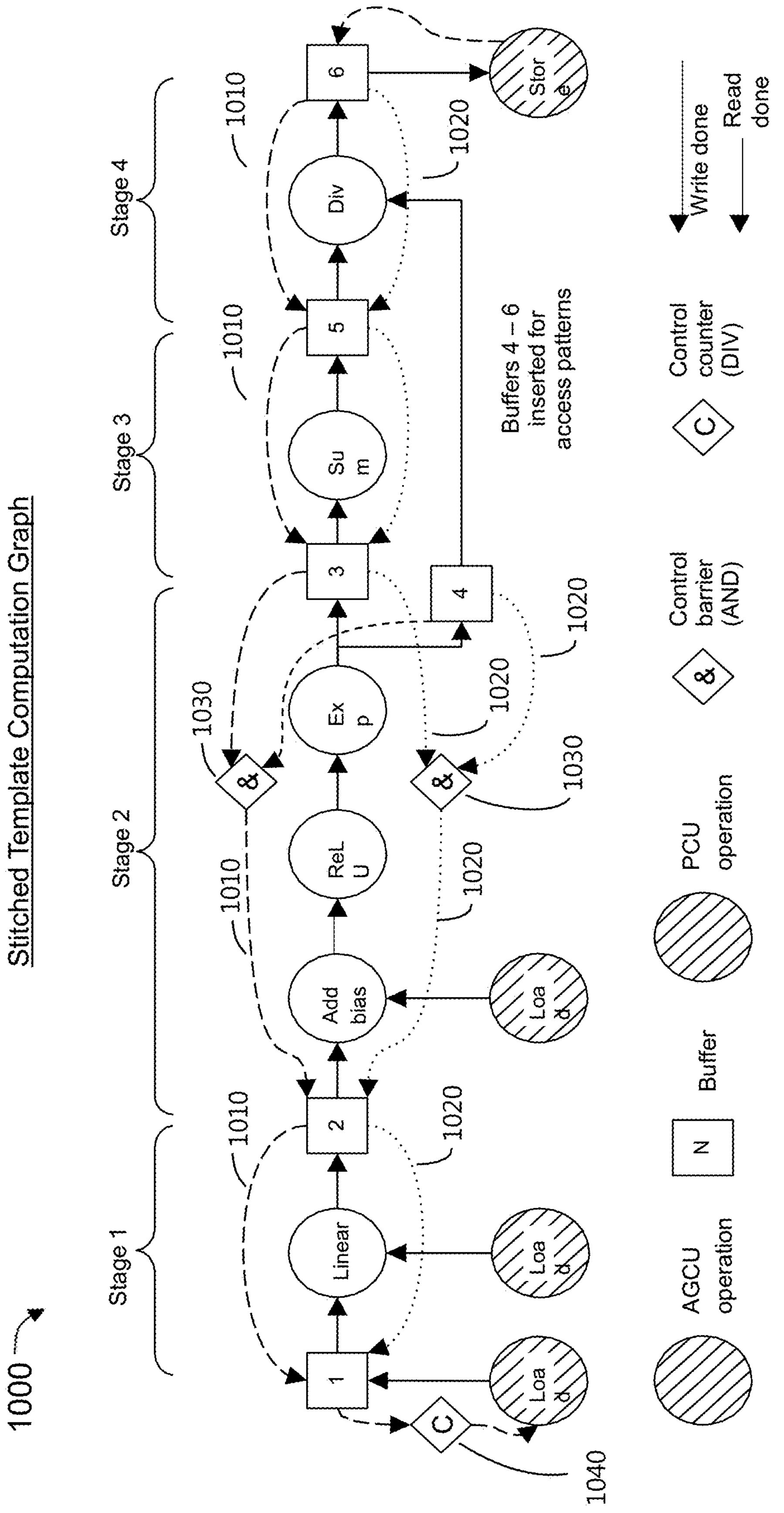
FIG. 10 shows an example implementation of the example user program in a fourth stage of a compiler stack.

FIG. 10 shows an example implementation of the example user program 700 in a fourth stage of the compiler stack. The template graph compiler 623 may also determine the control signals 1010 and 1020, as well as control gates 1030 and 1040 required to enable the CGR units (whether logical or physical) to coordinate dataflow between the CGR units in the CGR array of a CGR processor. This process, sometimes referred to as stitching, produces a stitched template compute graph 1000 with control signals 1010-1020 and control gates 1030-1040. In the example depicted in FIG. 10, the control signals include write done signals 1010 and read done signals 1020, and the control gates include 'AND' gates 1030 and a counting or 'DIV' gate 1040. The control signals and control gates enable coordinated dataflow between the configurable units of CGR processors such as compute units, memory units, and AGCUs.

PNR 625 translates and maps logical (i.e., unplaced physically realizable) CGR units (e.g., the nodes of the logical computation graph 1100 shown in FIG. 11) to a physical layout (e.g., the physical layout 1150 shown in FIG. 11) on the physical level, e.g., a physical array of CGR units in a semiconductor chip. PNR625 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator. PNR 625 may receive its input data in various ways. For example, it may receive parts of its input data from any of the earlier modules (dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Further implementations of compiler 620 provide for an iterative process, for example by feeding information from PNR 625 back to an earlier module, so that the earlier module can execute a new compilation step in which it uses physically realized results rather than estimates of or placeholders for physically realizable circuits. For example, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside an RDU. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into multiple subgraphs such as memory subgraphs or compute subgraphs and specifies these subgraphs in the PEF file1 167. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

After software-stack compilation of dataflow graphs, all compute nodes in the graph are assigned a dedicated pipeline stage with a stage buffer before and after that graph-node. A stage-buffer implementation can range from one to several PMUs and consumes variable on-chip SRAM resources. Compiler 620 may then estimate a latency for each stage in the pipeline and further determine the longest latency for each pipeline. As different nodes require varied compute complexity, some stages consume smaller latency compared to other nodes. In general, a data graph sample that has completed computation at the current stage will wait in a stage buffer before the next stage until the latter computation is complete for another sample.

As The AGCUs are operatively coupled to configure the PCUs and the PMUs using a configuration file. In one embodiment, upon being configured, the PCUs are coupled to execute multiple tasks included in the configuration file and further switch through corresponding PCU contexts to perform those. PMUs are memory units which are utilized by the PCUs while performing the multiple tasks can also switch through multiple PMU contexts. The following paragraphs will provide more details about examples of PCU contexts, PMU contexts, and finite state machines coupled to bring about switching of those contexts.

Figure 12:
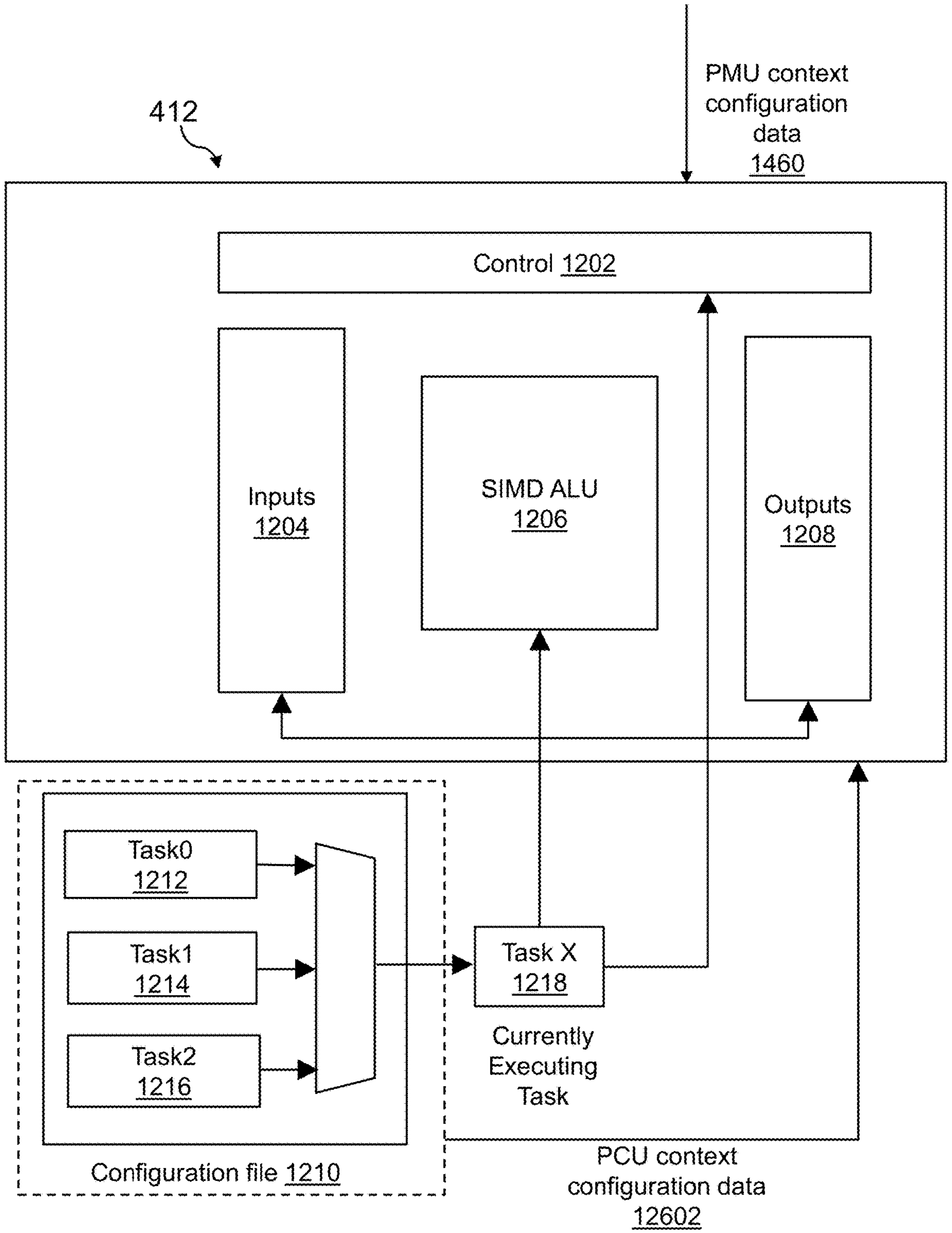
FIG. 12 illustrates an example of a PCU including various example blocks coupled to perform various tasks, according to an embodiment of the present disclosure.

PCU Multiple Contexts—FIG. 12 illustrates an example of a PCU such as the PCU 412 shown in FIG. 4 or PCU 560 shown in FIG. 5A, including various example blocks coupled to perform various tasks, according to an embodiment of the present disclosure. The other PCUs of FIG. 4 may also include similar blocks. The PCU 213 As shown the PCU 412 (shown in may include a control unit 1202, an inputs unit 1204, and outputs unit 1208, a single instruction multiple data (SIMD) ALU 1206. The example blocks shown in FIG. 12 represent a portion of the PCU blocks, and the PCU 412 can include further blocks and units as shown in FIG. 4 and FIG. 5. More specifically, the SIMD ALU 1206 can be an example of one of the SIMDs shown in FIG. 5. The inputs unit 1204 can be an example of the scalar inputs, vector inputs, and control inputs shown in FIG. 4. Similarly, the outputs unit 1208 can be an example of the scalar outputs, vector outputs, and control outputs shown in FIG. 4.

In one embodiment, the PCU 412 is coupled to receive a single configuration bit file (also known as configuration file) 1210 including multiple tasks task0 1212, task1 1214, and task2 1216. The configuration file 1210 can be one example of the configuration file 165 shown in FIG. 6. In one example, the PCU 412 is coupled to perform the multiple tasks task0 1212, task1 1214, and task2 1216 in any order depending on the requirement of the dataflow graph and configure a datapath to perform the task. For example, if taskX 1218 represents the task that is currently being executed, the PCU 412 can configure a datapath to perform the taskX 1218. The PCU 412 is coupled to configure a datapath using PCU context configuration data 1260 included in the configuration file 1210.

The datapath configured can include a plurality of functional units (FUs) in the PCU as shown in FIG. 4 such that those allow the SIMD ALU 1206 to perform multiple operations with a single instruction. Thus, the single task taskX 1218 can include multiple operations. Furthermore, multiple operations may need different datapaths. As shown at any given time the PCU 412 can pick up one of the tasks from the configuration bit file 1210 and can program units inside the PCU to perform the particular task on the specified inputs to generate the desired result. In one example, a configured dataptah for an operation or task is known as a "PCU context." In other examples, a PCU task can also be known as a "PCU context."

The progress of any task can be tracked using one or more counters. In one example, when counter reaches a pre-programmed maximum value a "done" event can be generated. Such events can be used to control the program flow in the RDU. The PCU 412 can be programmed to load a particular taskX 1218 from one of the available tasks in the configuration file 1210. Some examples of PCU task can include generating a mean or variance from a set of data points.

Static Context Switching—The switching between the tasks can be pre-programmed in the configuration file 1210 to switch from Task0 1212 to Task1 1214 to Task2 1216 and loop back as desired.

Dynamic Context Switching—In one embodiment, sequence of tasks can be dynamically determined during execution of the dataflow graph, depending on the outcome of the current task. For example, depending on the computed data at the end of Task0 1212 the PCU 412 can switch to either Task1 1214 or Task2 1216 giving it more flexibility.

As can be appreciated, context switching (static or dynamic) between different tasks can help reduce the number of the compute units (PCUs) required in a program or reuse the PCUs. It can also help increase the utilization of the PCUs in a program to reduce any idle time.

Some examples of methods (use cases) to implement the PCU multiple contexts are given below:

1. Softmax—
2. BatchNorm—In one example of this implementation, the Task0 1212 can be a "mean" function, the Task1 1214 can be a "variance" function, and Task2 1216 can be a "normalize" function.

PMU's multi-stage datapath pipeline—Embodiments herein disclose a multi-stage or a split data path pipeline. This feature provides flexibility of switching the configuration of any stage of any PMU's datapath pipeline to suit a required task. In other words, in scenarios where PCUs are switching among various tasks, PMUs have the capability to switch any stage of their data path pipelines independently according to the corresponding task and further a corresponding operation in the task that is being executed.

Figure 13A:
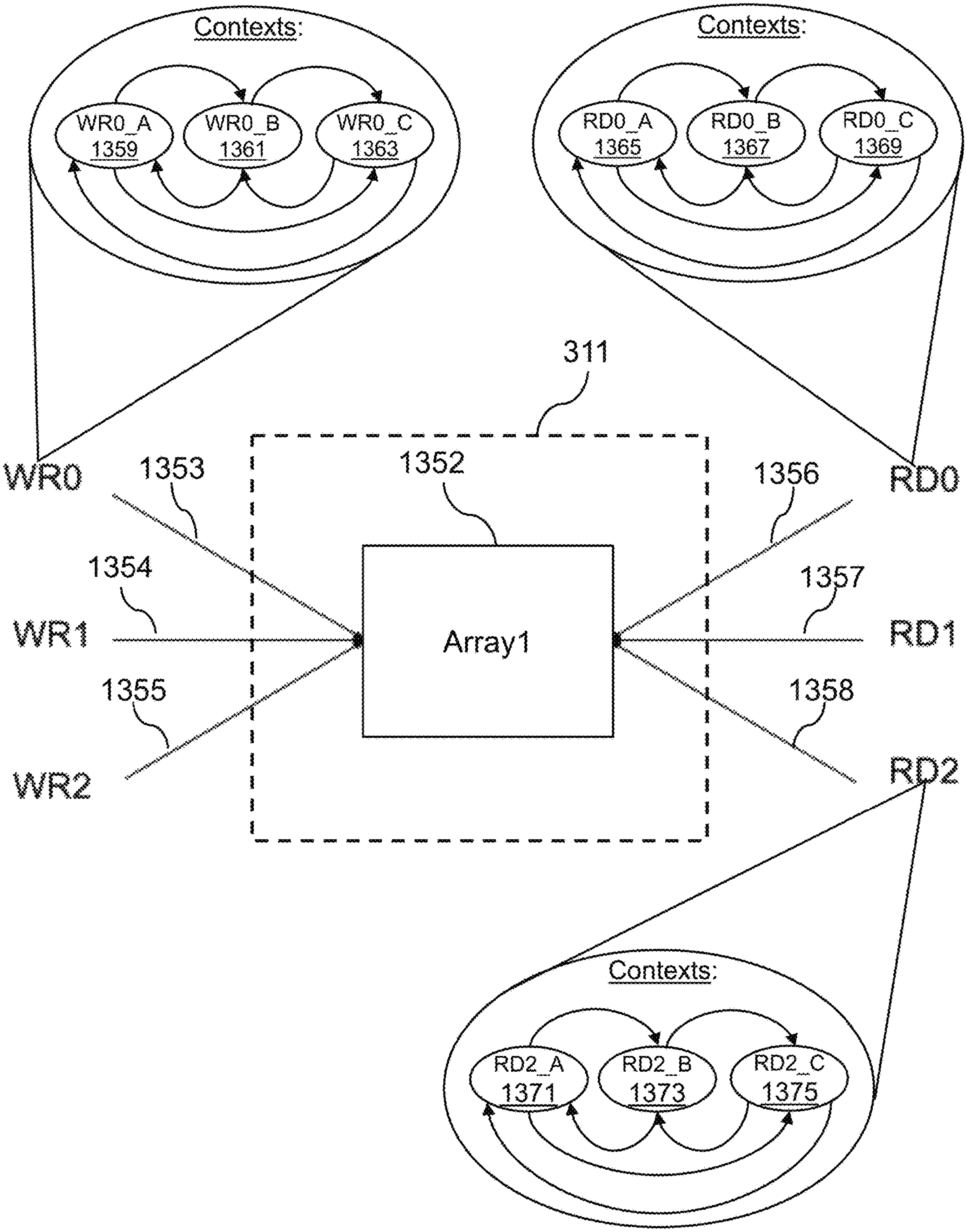
FIG. 13A illustrates an example of a single logical array included in a PMU, the array further including various operations, according to an embodiment of the present disclosure.

FIG. 13A illustrates an example of a single logical array which may be included in the PMU 411. As shown the PMU 411 includes an array1 1302 which can be configured to perform multiple write operations (WR0 1303, WR1 1354, and WR2 1355) and multiple read operations (RD0 1356, RD1 657, and RD2 1358). Each write and read operation can further include multiple write and read contexts respectively. In one example, a PMU context is a set of configuration fields in the PMU's datapath pipeline which are active for an operation to allow PCU to perform that operation. In other words, a PMU context can be a set of configuration fields that control the data path or the control path to a neighboring PCU. The array1 1302 may have many fields including IO, Counters, Control, Header, Pipeline, Special FN, pointer to use. Each write or read operation may require one or more of these fields to be configurable. Furthermore, there can be scratchpad configuration fields as well which may remain constant or may change between read and write operations.

For example, the write operation WR0 1303 is shown to include three write contexts WR0_A 1359, WR0_B 1361, and WR0_C 1363, meaning, each of these operation-specific configuration fields in the PMU's datapath can be or required to be active for the PCU to perform the write operation WR01303. During any write or read operation the PMU 411 can switch from one context to any other context as shown by the arrows. Similarly, the read operation RD0 1356 is shown to include three read contexts RD0_A 1365, RD1_B 1367, and RD3C_369. In other embodiments there can be as many contexts as required by the design. In one example, the configuration fields can be configuration bits. The configuration bits will be explained more details with respect to FIG. 14.

Figure 13B:
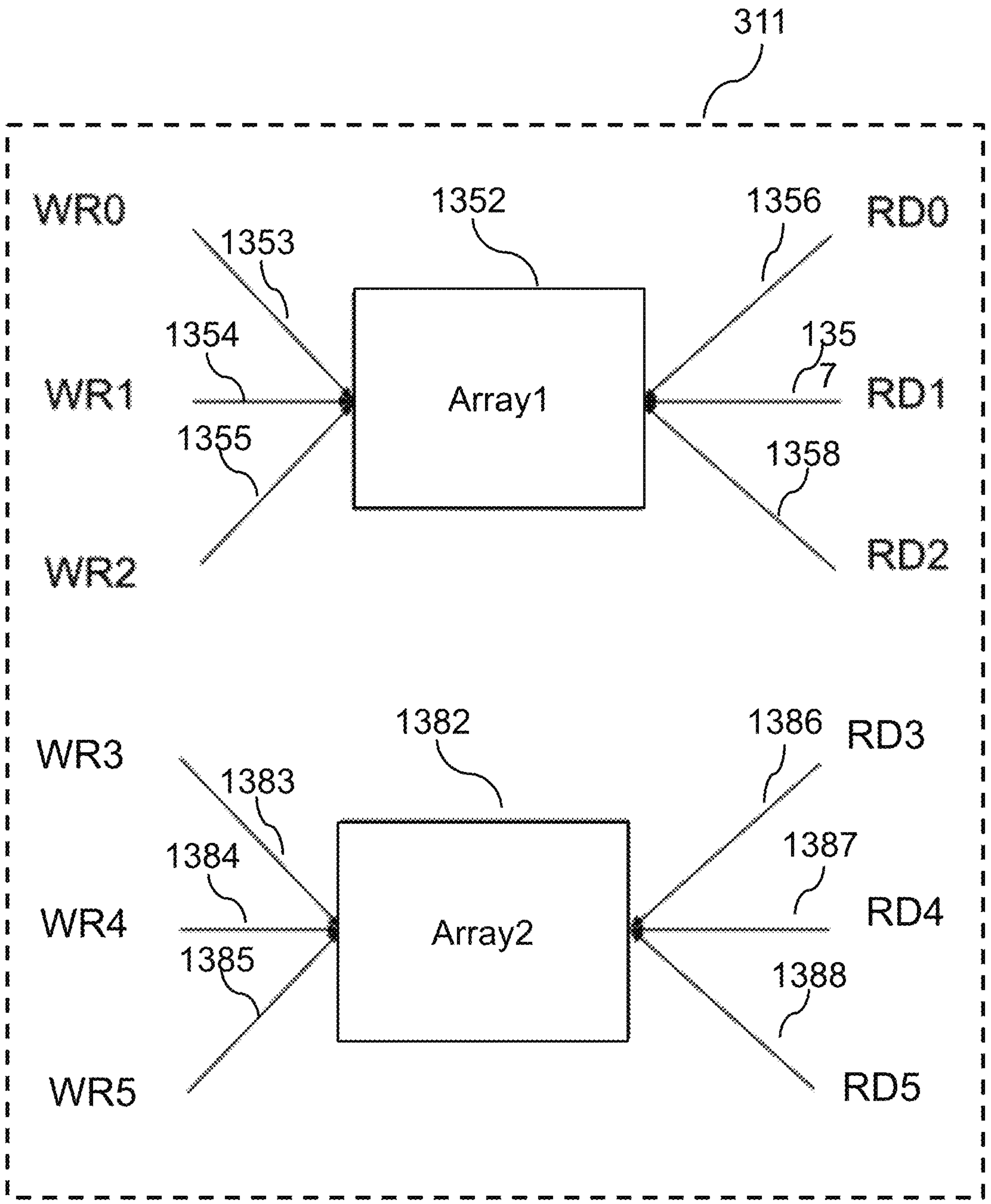
FIG. 13B illustrates an example of multiple logical arrays included in a PMU, each array further including various operations, according to an embodiment of the present disclosure.

FIG. 13B illustrates an example of multiple logical arrays which may be included in the PMU 411. As shown the PMU 411 includes the array1 1302 (shown previously in FIG. 13A) and an array2 1382. In one example, to perform each operation the PMU 411 may need to change several contexts (set of configuration fields.) More specifically, the array1 1302 needs be configured to provide a data and control path for the neighboring PCU to perform multiple write operations (WR0 1303, WR1 1354, and WR2 1355) and multiple read operations (RD0 1356, RD1 1357, and RD2 1358). Furthermore, since each read and write operation includes multiple contexts, the PMU need to be configured for each of those contexts. Similarly, the array2 1382 needs be configured for multiple write operations (WR3 1383, WR4 1384, and WR5 1365) and multiple read operations (RD3 1386, RD4 1387, and RD5 1388) and their corresponding contexts.

The PMU 411 may have many configurable bits including IO, Counters, Control, Header, Pipeline, Special FN, pointer to use, and scratchpad. Each write or read context can require one or more of these fields to be configurable. Some bits may be common to multiple write and read contexts, whereas some bits may change as the contexts change. Additionally, if the PMU has multiple arrays, then the scratchpad configuration bits in the multiple arrays may change between the read and write operations.

According to one embodiment, the PMU's data path pipeline can have multiple segments and each segment can have separate configuration bits allowing any segment to be configured separately in case a context is switched. As will be explained in more details with regard to FIG. 14 and FIG. 15, any segment can be switched independently of the others. i.e., any context in the multiple contexts for an operation can be switched independent of other contexts. For example, Additionally, all the segments can be switched simultaneously. The following figures and descriptions will explain this in further details.

Figure 14:
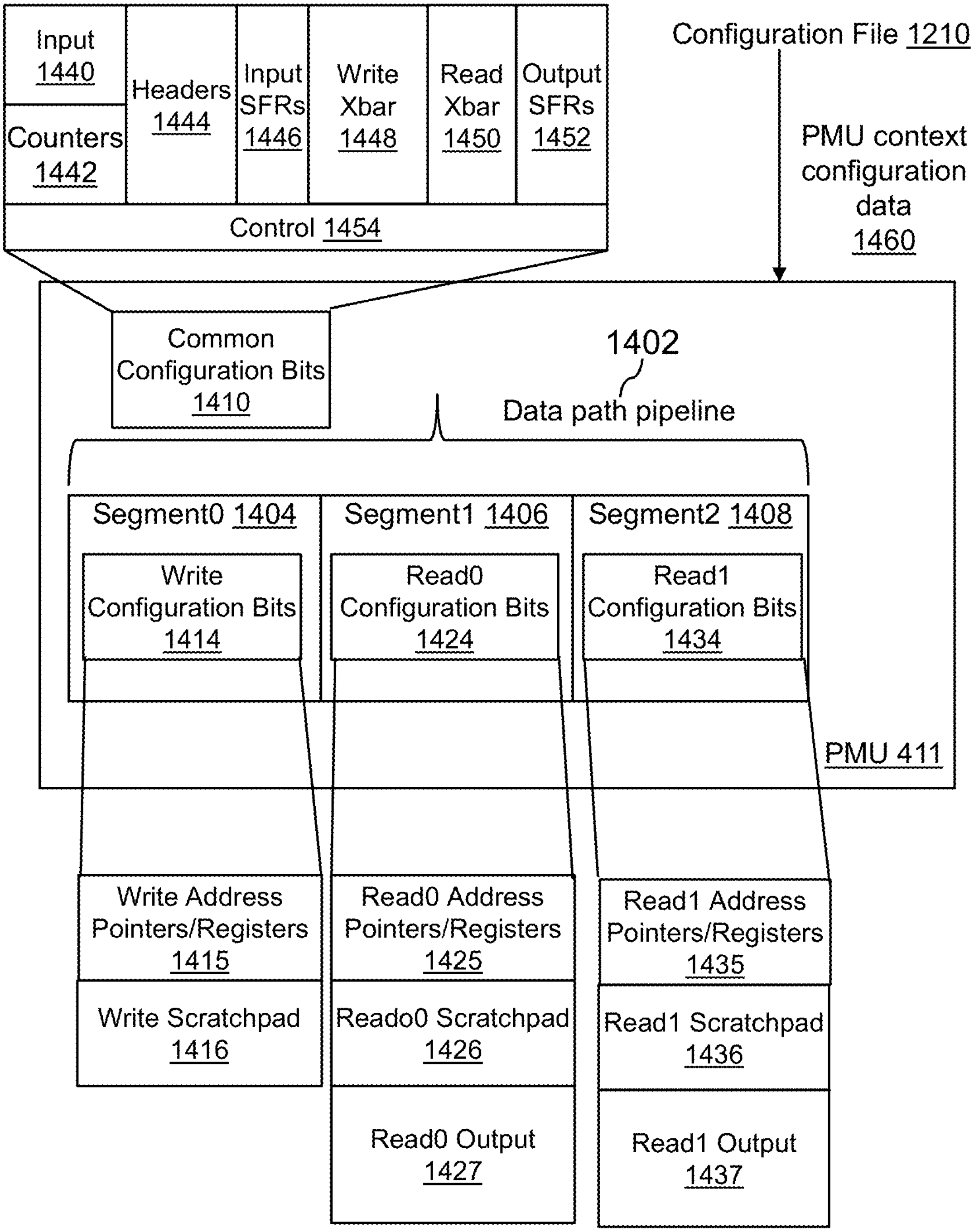
FIG. 14 illustrates an example PMU including an example datapath pipeline including a plurality of segments for any context included in any operations (such as read or write), according to an embodiment of the present disclosure.

FIG. 14 illustrates an example PMU 411 including an example data path pipeline 1402 including three separate and independent segments (stages), and each segment can collectively can handle multiple contexts for any PMU operation (such as read or write) pertaining to any PCU task. The length of any segment can be variable. Furthermore, the segments can be reassigned in between any contexts in any order. Although the example of FIG. 14 shows three segments, there can be as many segments as required by the design. In general, the number segments can range from 1 to "n" where "n" can be any integer value as programmed by software. In some cases, the value of "n" may change on the fly as and when required.

In the example shown, the segment0 1404 is for a write operation, the segment1 1406 and segment2 1408 are for read operations. If WR0 1353 is considered as a current PMU operation, then the segment0 1404 can have multiple contexts WR0_A 1359, WR0_B 1361, and WR0_C 1363, i.e., configuration bits in the segment0 1404 are set up for each of those in any order to activate the corresponding datapaths.

The segment0 1404 can have multiple contexts The PMU 411 can include some common configuration bits 1410. Additionally, each segment can have its separate configuration bits based on the operation it supports. For example, the segment0, segment1, segment2 further includes write configuration bits 1414, read0 configuration bits 1424, and read1 configuration bits 1434 respectively. In other embodiments, there can be as many segments for each write and read operation as supported by the PMU arrays.

Example common configuration bits 1410 can further include bits for input 1440, counters 1442, headers 1444, input SFRs 1446, write crossbar (xbar) 1448, read crossbar (xbar) 1450, output SFRs 1452.

In the segment0 1404, example write configuration bits 1414 can further include bits for write address pointers/registers 1415 and write scratchpad 1416. In the segment1 1406, example write configuration bits 1424 can further include bits for read0 address pointers/registers 1425, read0 scratchpad 1426, and read0 output 1427. In the segment1 1406, example read0 configuration bits 1424 can further include bits for read0 address pointers/registers 1425, read0 scratchpad 1426, and read0 output 1427. Similarly, in the segment2 1408 example read1 configuration bits 1434 can include bits for read1 address pointers/registers 1435, read1 scratchpad 1436, and read1 output 1437. It should be noted that the PMU 411 is also coupled to receive the configuration file 1210. As explained earlier, the various configuration bits for a PMU context can be referred to as "PMU context configuration data," 1460 which can be received via the configuration file 1210.

As will be explained with respect to FIG. 15, in one embodiment, the configuration bits for write 1414, read0 1424, and read1 1434 respectively can be switched independently depending on the contexts to be executed.

Figure 15:
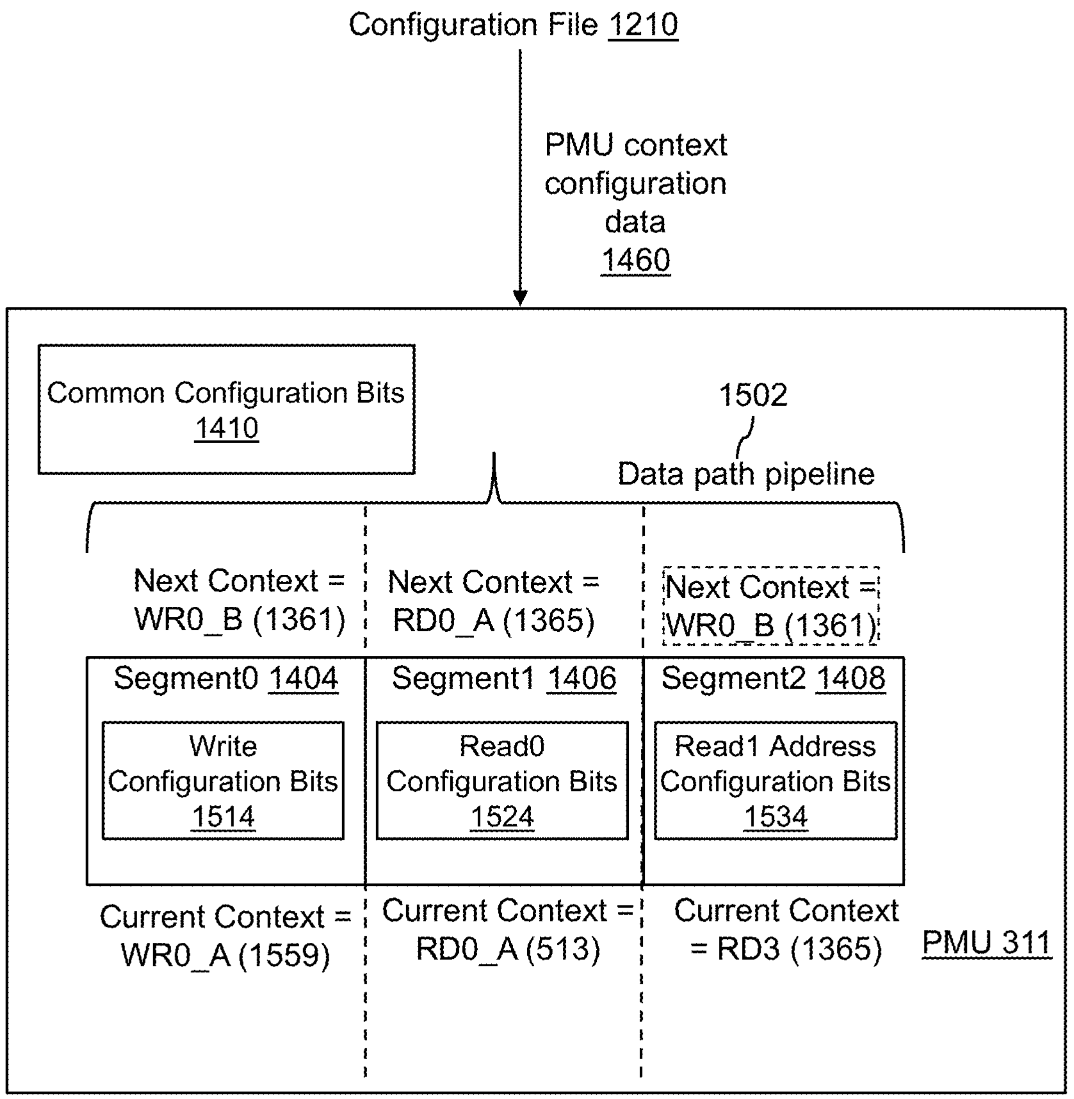
FIG. 15 illustrates the datapath pipeline shown in FIG. 14 further including example current contexts and next contexts, according to an embodiment of the present disclosure.

FIG. 15 illustrates the PMU 411 along with example current contexts and next contexts. For example, for segment0 1404 the current context is WR0_A 659 and the next context is WR0_B 1361. For segment1 1406 the current context is RD0_A 1357 and the next context is also RD0_A 1357. For segment2 1408 the current context is RD3_A 1371 and the next context is RD3_A 1373. These are the contexts which are part of the write and read operations to be executed by any of the neighboring PCUs for example the PCU 412 shown in FIG. 4.

As explained earlier, for any task being executed by the PCU, the corresponding PMU needs switch through various contexts (states of configuration bits which control the data path). According to one embodiment, every time the PCU switches an operation or plans to switch to a new operation, one or more segments of the PMU can transition through various contexts (state of configuration bits). Additionally, the context switching in the same segment can occur one after the other in any order and the context switching in two different segments can occur concurrently. In the example shown, the segment0 1404 can switch its contexts, from the context WR0_A 1359 to the context WR0_B 1361 (in other cases it can be from WR0_C 1363 as well.) Similarly in the example shown, the segment segment2 1408 can switch contexts from context RD3 1365 to WR0_B 1361. However, both these segments can switch their corresponding contexts concurrently; i.e., the context switching from WR0_A 1359 to the context WR0_B 1361 in segment0 1404 can occur concurrently with the context switching from RD3 1365 to the context WR0_B 1361 in segment2 1408. Furthermore, the context WR0_B 1361 can occur in any segment of the segments segment0 1404, segment1 1406, and segment2 1408.

In this example, in the segment0 1404 and segment2 1408, the next contexts are different, whereas in segment1 1406, the next context is the same. This means that the PMU 411 needs to switch the configuration write bits 1414 for segment0 1404 and read1 configuration bits 1434 segment2 1408. In one embodiment, the PMU 411 can switch these configuration bits segments segment0 1404 and segment2 1408 without changing the configuration bits for segment1.

It should be noted that the write configuration bits 1414 and read1 configuration bits 1434 can be switched independently or simultaneously. In one embodiment, the configuration bits for any or all the segments can be changed independently or simultaneously on in any given combination or order.

PMU Context States—Different groups of configuration bits may be known as configuration fields. The context state of a PMU can be defined as a union of such context fields. Some examples of context fields are shown below:

1. Common (Config bits shared across all contexts: Counters, UDCs, controllers, Xbars),
2. Write A-C, X (Write configuration bits. A, B, C: contexts. X: Special 'unused' context),
3. Read0 A-C, X (Read0 configuration bits. A, B, C: contexts. X: Special 'unused' context),
4. Read1 A-C, (Read1 configuration bits. A, B, C: contexts. X: Special 'unused' context),
5. ScratchA-C(Scratchpad configuration—includes mode and address range checks),
6. OutO A-C—(Reado output configuration and credit management),
7. Out1 A-C(Read1 output configuration and credit management.)

In one embodiment, each context field above can be independently switched. FIGS. 16A to 16F illustrate example state machines which illustrate context switching. For example, in FIG. 14, the configuration bits for write address/pointers registers 1415 can form one context field and the configurations bits write scratchpad 1416 can form a second context field. Similarly, groups of configurations bits for read0 address/pointers registers 1425, read0 scratchpad 1426, read0 output 1427, read1 address/pointers registers 1435, read1 scratchpad 1436, and read1 output 1437 each can form a separate context field. Furthermore, under common configuration bits 1410, groups of configuration bits for input 1440, counters 1442, headers 1444, input SFRs 1446, write crossbar 1448, read crossbar 1450, output SFRs 1452, and control 1454 each can form a separate context field. Each of the above-mentioned context fields can be switched independently.

PMU Context State Machines—The switching of various PMU contexts in various context states can be implemented by one or more finite state machines (FSMs). In one embodiment, there can be one set of write context states, two sets of read context states, one set of scratchpad context states, and two sets of output context states. There can be a separate FSMs for each set of context states. In other embodiments, a single FSM can correspond to a plurality of context states as well. As explained earlier, each context state corresponds to a particular state of configuration bits.

Figure 16A:
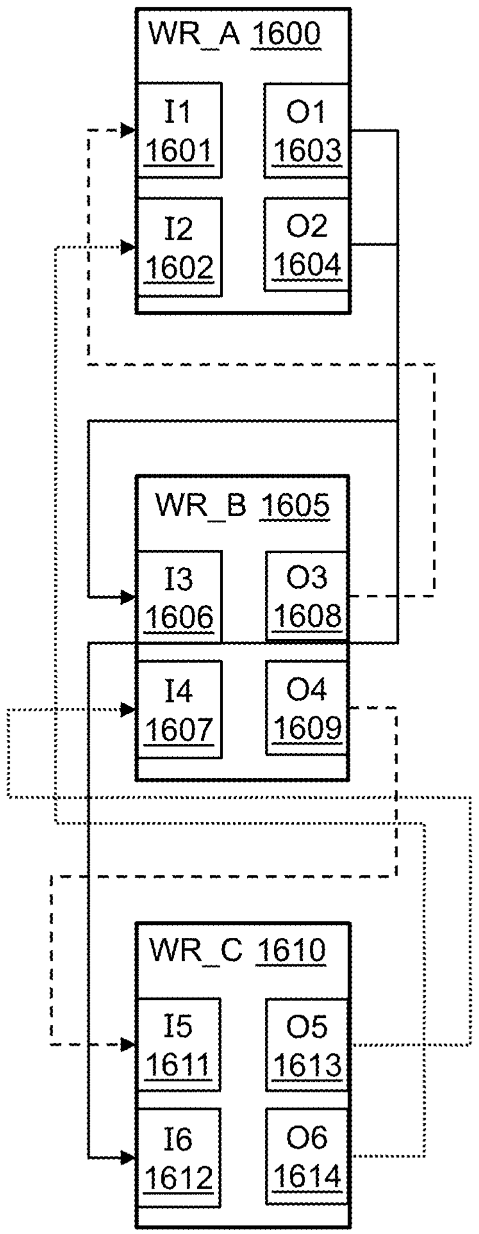
FIGS. 16A, 16B, 16C, 16D, 16E, and 16F illustrate examples of FSMs for a plurality of states and contexts respectively, according to an embodiment of the present disclosure.

FIGS. 16A, 16B, 16C, 16D, 16E, and 16F illustrate exemplary FSMs for write, read0, read1, scratchpad, output0, and output1 context states respectively. As can be seen in the FSM of FIG. 16A the various contexts states are represented by a first state wr_a 1600 (having inputs i1 1601, i2 1602, and outputs o1 1603, and o2 1604), a second state wr_b 1605 (having inputs i3 1606, i4 1607, and outputs o3 1608, and o4 1610), and a third state wr_c 1610 (having inputs i5 1611, i6 1612, and outputs o5 1613, and o6 1614).

Figure 16B:
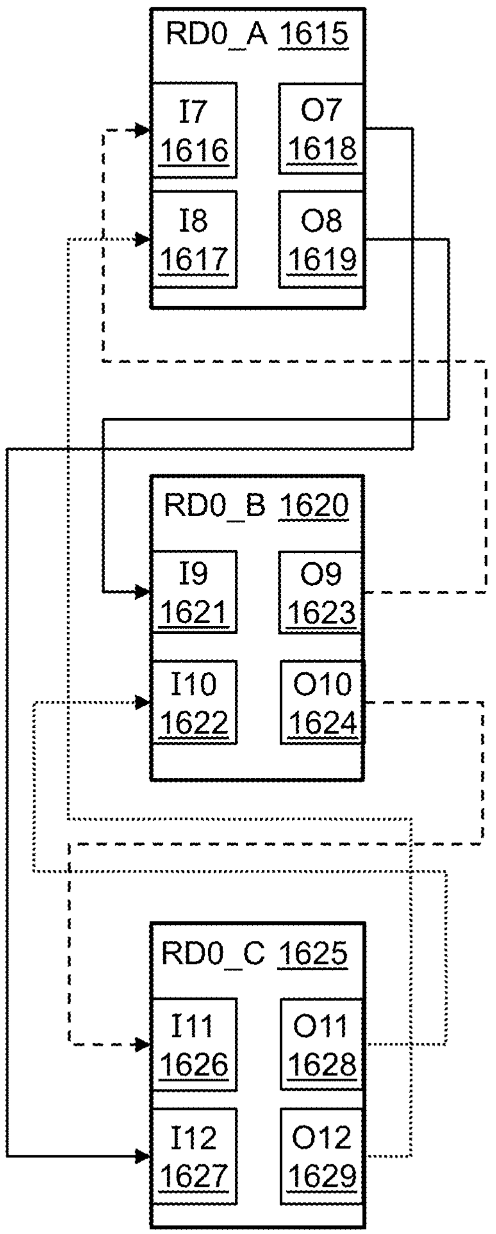

In the FSM of FIG. 16B the various contexts states are represented by a first state rd0_a 1615 (having inputs i7 1616, i8 1617, and outputs o7 1618, and o8 1619), a second state rd0_b 1620 (having inputs i9 1621, i10 1622, and outputs o9 1623, and o10 1624), and a third state rd0_c 1625 (having inputs i11 1626, i12 1627, and outputs o11 1628, and o12 1629). In one example, the PMU 411 can switch from any output to any input as shown by the solid, dashed, and dotted arrows.

Figure 16C:
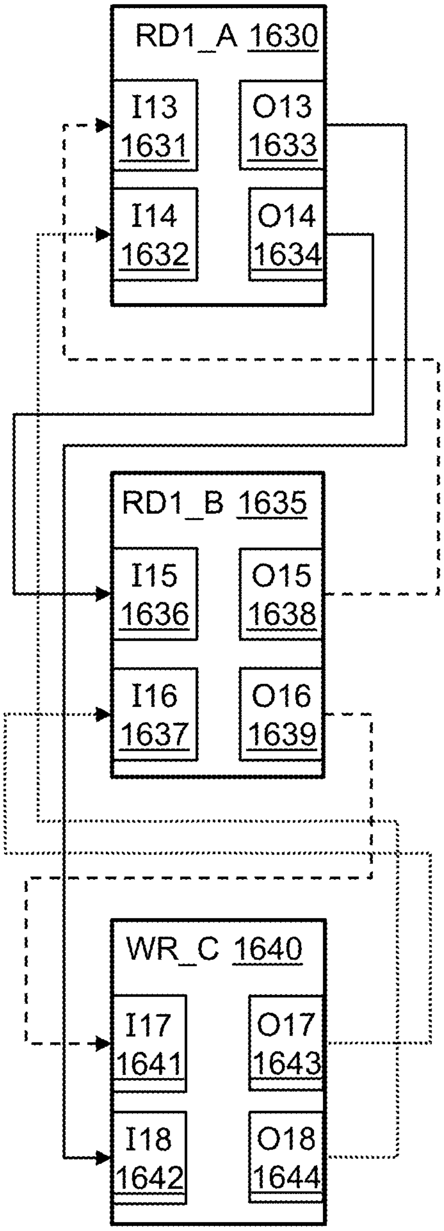

In the FSM of FIG. 16C the various contexts states are represented by a first state rd1_a 1630 (having inputs i13 1631, i14 1632, and outputs o13 1633, and o14 1634), a second state rd1_b 1635 (having inputs i15 1635, i16 1637, and outputs o15 1638, and o15 1639), and a third state wr_c 1640 (having inputs i17 1641, i180 1642, and outputs o17 1643, and o18 1644). In one example, the PMU 411 can switch from any output to any input as shown by the solid, dashed, and dotted arrows.

Figure 16D:
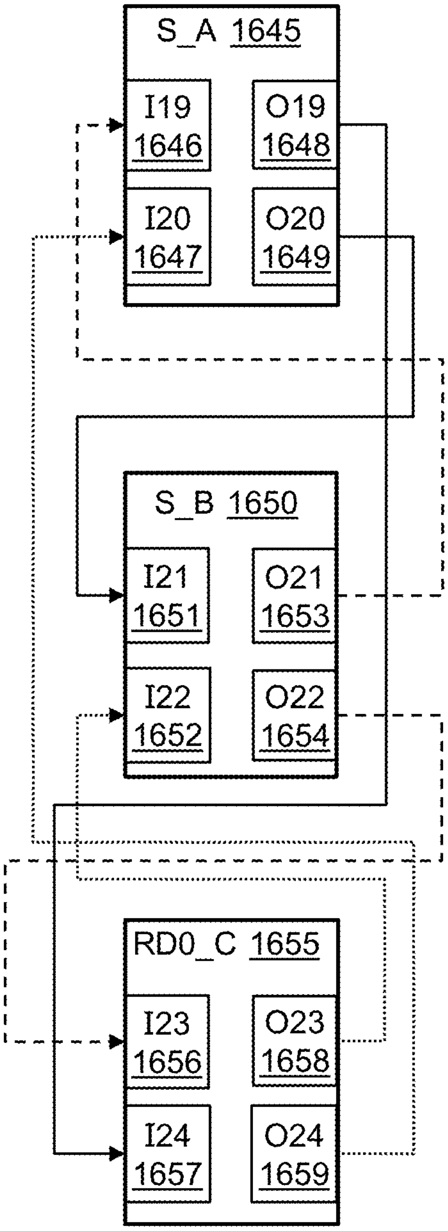

In the FSM of FIG. 16D the various contexts states are represented by a first state s_a 1645 (having inputs i19 1646, i20 1647, and outputs o19 1648, and o20 1649), a second state s_b 1650 (having inputs i21 1651, i22 1652, and outputs o21 1653, and o22 1654), and a third state rd0_c 1655 (having inputs i23 1656, i24 1657, and outputs o23 1658, and o24 1659). In one example, the PMU 411 can switch from any output to any input as shown by the solid, dashed, and dotted arrows.

Figure 16E:
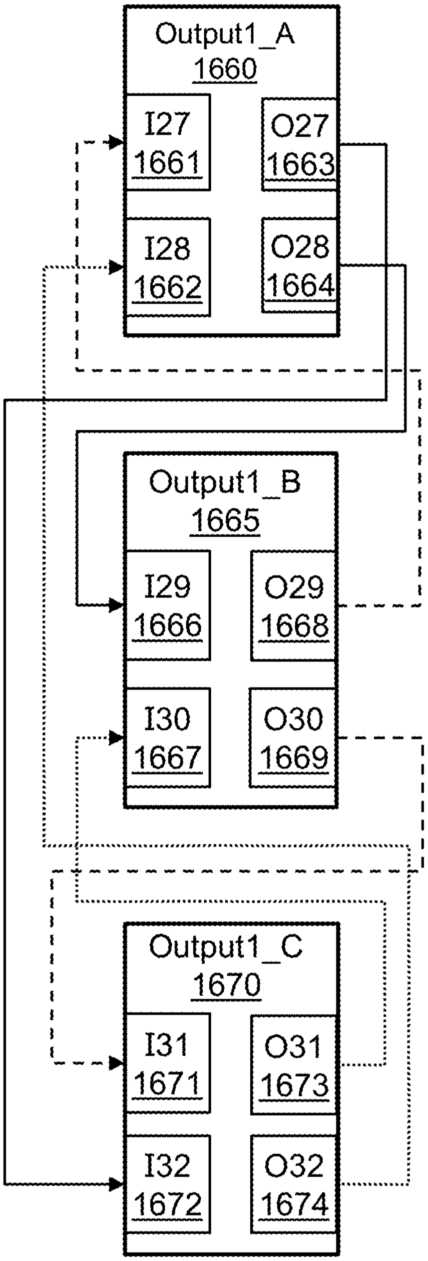

In the FSM of FIG. 16E the various contexts states are represented by a first state output1_a 1660 (having inputs i27 1661, i28 1662, and outputs o27 1663, and o28 1664), a second state output1_b 1665 (having inputs i29 1666, i30 1667, and outputs o29 1668, and o30 1669), and a third state output1_c 1670 (having inputs i31 1671, i32 1672, and outputs o31 1673, and o32 1674). In one example, the PMU 411 can switch from any output to any input as shown by the solid, dashed, and dotted arrows.

Figure 16F:
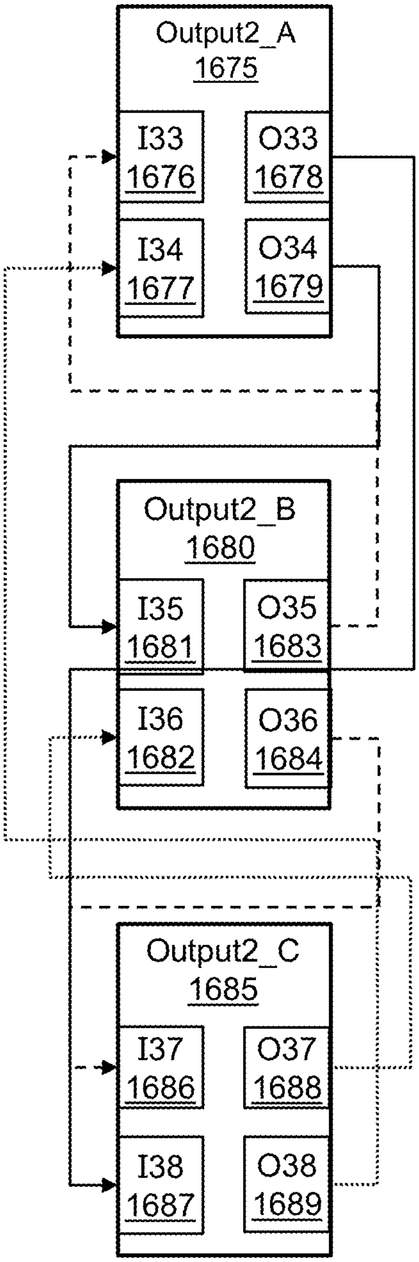

In the FSM of FIG. 16F the various contexts states are represented by a first state output2_a 1675 (having inputs i33 1676, i34 1677, and outputs o33 1678, and o34 1679), a second state output2_b 1680 (having inputs i35 1681, i36

1682, and outputs o35 1683, and o36 1684), and a third state output2_c 1685 (having inputs i37 1686, i38 1687, and outputs o37 1688, and o38 1689). In one example, the PMU 411 can switch from any output to any input as shown by the solid, dashed, and dotted arrows.

In one example, there can be as many FSMs as the context states. In other examples, a fewer number of FSMs can the other FSMs also similar context states can be seen with various inputs and outputs. In one embodiment, in any of the above FSMs, the PMU 411 can switch from any output to any input as shown by the solid, dashed, and dotted arrows. Although each state is shown with two separate inputs and two separate outputs, in one embodiment, internally the inputs and the outputs may be combined.

PMU Context Switching Mechanism—The switching of the contexts (configuration bits) in any of the states can occur independently for any segment and can be implemented via one or more multiplexers, demultiplexers, flip-flops, in combination with the FSMs shown above or other basic electronic circuits.

Figure 17:
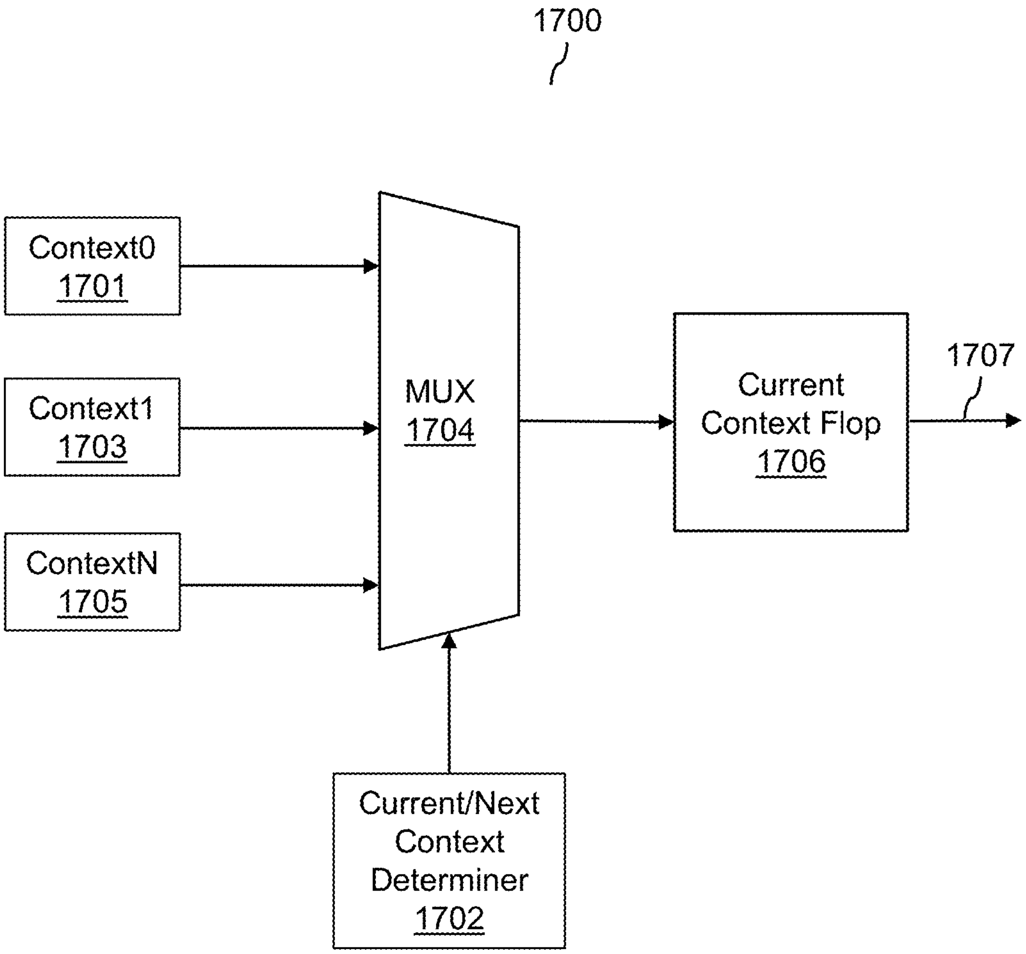
FIG. 17 illustrates an example block diagram for a context state switch control block which may be included in a PMU or implemented separately, accordingly an embodiment of the present disclosure.

FIG. 17 illustrates an example block diagram for a context state switch control block which may be included in the PMU 411 or may be implemented separately. As shown, it may include a current/next context determiner 1702, a multiplexer mux 1704, and a current context flop 1706. In one embodiment, the mux 1704 may be coupled to select among various contexts contex0 1701 to context 1705 based on an input from the context determiner 1702 and provide the selected context to the current context flop 1706. The output of the current context flop can provide the current context 1707 to a particular PMU segment. Any other similar software or hardware can be used to implement the above operation. There can be several other implementations of this mechanism.

In order to switch from one context to another, the FSM can transition through one or more states. An example of this is shown in FIG. 18 in which the FSM 1800 includes the following states: context_idle 1802, context_drain 1804, context_stall 1806, and context_switch 1808. In general, the PMU context switching can include the following steps:

Initially, the FSM 1800 is in idle state. When a context_switch is requested, a UDC (up-down counter) can be set indicating the context_switch request. The FSM 1800 can then switch to the state context_drain 1804.

In the state context_drain 1804, the PMU can wait for the switching operation(s) to drain. This means that no new enables on those operations can start. Once the pipeline has no enable or done signals, the FSM 1800 can proceed to the state cotext_stall. In the context_drain state context_drain 1804, most non-switching operations except for a scratchpad switch can continue to run. If there is a scratchpad switch, then all operations can stop and be drained. In CH, output context had the same requirement.

In the context_stall state 1806, all the PMU operations except for the control signals or inputs. There may be a wait of a plurality of cycles or in one embodiment two cycles for the scratchpad to finish any reads. The stall propagates with the scratchpad reads. Once stalled, the PMU may wait for external events to stabilize. All output FIFOs may need to drain, After that in the context_switch state 1808, the FSM 1800 can perform a context switch and wait for the MCP to propagate. In this state various configuration bits are set or reset using a combination of flip-flops, muxes, and logic gates. All operations are stalled during the switch. The stall can then be released.

To summarize, in the context_idle state, the FSM 1800 is waiting for a context switch request. In the context_drain state, the FSM 1800 can wait until the data path pipeline is drained for the requesting operations. In the context_stall state, a stall can be asserted for it to be propagate to the tail of the pipeline before moving to the context_switch state.

In the context_switch state the stall can be continued to be asserted to allow for any optional checks (configurable) to be performed such as draining output fifos, performing all credits returned, before performing the context_switch. This stage can last for at least four cycles to cover the 4 cycle MCP window once the qualifications are met, and the actual context_switch starts. The FSM ? only progresses in one direction until SWITCH is finished and then returns to IDLE. In one embodiment, the FSM only progresses in one direction until SWITCH is finished and then returns to the context_idle state 1802.

Examples of various embodiments are described in the following paragraphs:

Example A1: A data processing system comprising a coarse-grained reconfigurable (CGR) processor including a plurality of pattern compute units (PCUs) and a plurality of pattern memory units (PMUs) configured to execute a dataflow graph, a PCU coupled to a PMU via a multi-segment datapath pipeline, the PCU coupled to receive a configuration file including PCU configuration data, the PMU coupled to receive the configuration file including PMU configuration data, and a finite state machine (FSM), wherein the PCU is coupled to configure a datapath including a plurality of functional units using the PCU configuration data for a plurality of to perform a task including a plurality of operations, wherein the PMU is coupled to configure, a plurality of fields in a segment of a multi-segment datapath pipeline corresponding to an operation using a PMU context including a set of configuration bits to activate a segment of the multi-segment datapath pipeline, wherein the PMU is coupled to switch the plurality of fields in the segment using a plurality of PMU contexts, and wherein the finite state machine (FSM) is configured to progress through a plurality of states corresponding to the plurality of PMU contexts, wherein the FSM can switch from one state to another state to allow the PMU switch between any two contexts in the segment sequentially, and wherein a plurality of FSMs corresponding to a plurality of segments can switch among a plurality states to allow switching of contexts in the plurality of segments concurrently.

Example A2: The system of example A1, wherein the operation can be a read or write operation.

Example A3: The system of example A1, wherein the plurality of states include an idle state, a drain state, a stall state, and a switch state.

Example A4: The system of example A3, wherein in the idle state, the FSM is coupled to receive a PMU context switch request and further can progress to the drain state.

Example A5: The system of example A4, wherein in the drain state, the FSM is coupled to allow the PMU to drain any current operations in the segment and then progress to the stall state.

Example A6: The system of example A5, wherein in the stall state, the FSM is coupled to wait for a current operation to finish and further progress to the switch state.

Example A7: The system of example A6, wherein in the switch state, the FSM is coupled to switch from a current PMU context to a next PMU context.

Example A8: A method for a coarse-grained reconfigurable (CGR) processor including an array of pattern compute units (PCUs) and pattern memory units (PMUs) configured to execute a dataflow graph, a PCU and a PMU coupled via a multi-segment datapath pipeline, the PMU comprising a plurality of data structures, and a finite state machine (FSM), the method comprising: receiving via a configuration file, PCU configuration data for the PCU, receiving via the configuration file, PMU configuration data for the PMU, configuring a datapath including a plurality of functional units in the PCU using the PCU configuration data to perform a task including a plurality of operations, configuring a plurality of fields in a segment of a multi-segment datapath pipeline corresponding to an operation using a PMU context including a set of configuration bits to activate the segment, switching the plurality of fields in the segment using a plurality of PMU contexts, configuring the FSM through a plurality of states corresponding to the plurality of PMU contexts, sequentially switching between any two PMU contexts in the segment by switching between their corresponding FSM states, and concurrently witching among a plurality of states for a plurality of FSMs corresponding to a plurality of segments to allow switching of PMU contexts in the plurality of segments.

Example A9: The method of example A8, wherein the operation can be a read or write operation.

Example A10: The method of example A8, wherein the plurality of states include an idle state, a drain state, a stall state, and a switch state.

Example A11: The method of example A10, further comprising receiving in the idle state, a PMU context switch request, and further advancing the FSM to the drain state.

Example A12: The method of example A11, further comprising draining in the drain state, any pending operation-specific data in the segment, and further advancing the FSM to the stall state.

Example A13: The method of example A12, waiting by the FSM in the stall state to add a wait period and further advancing the FSM to the switch state.

14. Example A14: The method of example A13 further comprising in the switch state, switching from a current PMU context to a next PMU context.

15. Example A15: A non-transitory computer readable medium having instructions encoded thereon datapath configuring solutions for reconfigurable dataflow computing systems comprising a coarse-grained reconfigurable (CGR) processor including an array of CGR unit reconfigurable units including a plurality of pattern compute units (PCUs) and a plurality of pattern memory units (PMUs) configured to execute a dataflow graph, a PMU coupled to a PCU via a multi-segment datapath pipeline, the instructions configured to cause a processor to conduct a method comprising: receiving via a configuration file, PCU configuration data for the PCU, receiving via the configuration file, PMU configuration data for the PMU, configuring a datapath including a plurality of functional units in the PCU using the PCU configuration data to perform a task including a plurality of operations, configuring a plurality of fields in a segment of a multi-segment datapath pipeline corresponding to an operation using a PMU context including a set of configuration bits to activate the segment, switching the plurality of fields in the segment using a plurality of PMU contexts, configuring the FSM through a plurality of states corresponding to the plurality of PMU contexts, sequentially switching between any two PMU contexts in the segment by switching between their corresponding FSM states, and concurrently witching among a plurality of states for a plurality of FSMs corresponding to a plurality of segments to allow switching of PMU contexts in the plurality of segments.

Example A16: The method of example A15, wherein the operation can be a read or write operation.

Example A17: The method of example A15, wherein the plurality of states include an idle state, a drain state, a stall state, and a switch state.

Example A18: The method of example A17, further comprising receiving in the idle state, a PMU context switch request, and further advancing the FSM to the drain state.

Example A19: The method of example A17, further comprising draining in the drain state, any pending operation-specific data in the segment, and further advancing the FSM to the stall state.

Example A20: The method of example A17, waiting by the FSM in the stall state to add a wait period and further advancing the FSM to the switch state.

Example A21: The method of example A17 further comprising in the switch state, switching from a current PMU context to a next PMU context.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g., 1 to 5 includes 1, 2.78, π, $3.\overline{33}$, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where the first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described example embodiments but should be defined only in accordance with the following claims and equivalents thereof.

We claim as follows:

1. A data processing system comprising a coarse-grained reconfigurable (CGR) processor including a plurality of pattern compute units (PCUs) and a plurality of pattern memory units (PMUs) configured to execute a dataflow graph, a PCU coupled to a PMU via a multi-segment datapath pipeline, the PCU coupled to receive a configuration file including PCU configuration data, the PMU coupled to receive the configuration file including PMU configuration data, and a finite state machine (FSM), wherein the PCU is coupled to configure a datapath including a plurality of functional units using the PCU configuration data to perform a task including a plurality of operations, wherein the PMU is coupled to configure, a plurality of fields in a segment of a multi-segment datapath pipeline corresponding to an operation using a PMU context including a set of configuration bits to activate a segment of the multi-segment datapath pipeline, wherein the PMU is coupled to switch the plurality of fields in the segment using a plurality of PMU contexts, and wherein the finite state machine (FSM) is configured to progress through a plurality of states corresponding to the plurality of PMU contexts, wherein the FSM can switch from one state to another state to allow the PMU switch between any two contexts in the segment sequentially, wherein a plurality of FSMs corresponding to a plurality of segments can switch among a plurality states to allow switching of contexts in the plurality of segments concurrently, wherein the plurality of states include an idle state, a drain state, a stall state, and a switch state, wherein in the idle state, the FSM is coupled to receive a PMU context switch request and further can progress to the drain state, wherein in the drain state, the FSM is coupled to allow the PMU to drain any current operations in the segment and then progress to the stall state, and wherein in the stall state, the FSM is coupled to wait for a current operation to finish and further progress to the switch state.

2. The system of claim 1, wherein the operation can be a read or write operation.

3. The system of claim 1, wherein in the switch state, the FSM is coupled to switch from a current PMU context to a next PMU context.

4. A method for a coarse-grained reconfigurable (CGR) processor including an array of pattern compute units (PCUs) and pattern memory units (PMUs) configured to execute a dataflow graph, a PCU and a PMU coupled via a multi-segment datapath pipeline, the PMU comprising a plurality of data structures, and a finite state machine (FSM), the method comprising:

receiving via a configuration file, PCU configuration data for the PCU, receiving via the configuration file, PMU configuration data for the PMU, configuring a datapath including a plurality of functional units in the PCU using the PCU configuration data to perform a task including a plurality of operations, configuring a plurality of fields in a segment of a multi-segment datapath pipeline corresponding to an operation using a PMU context including a set of configuration bits to activate the segment, switching the plurality of fields in the segment using a plurality of PMU contexts, configuring the FSM through a plurality of states corresponding to the plurality of PMU contexts, sequentially switching between any two PMU contexts in the segment by switching between their corresponding FSM states, concurrently switching among a plurality of states for a plurality of FSMs corresponding to a plurality of segments to allow switching of PMU contexts in the plurality of segments, wherein the plurality of states include an idle state, a drain state, a stall state, and a switch state, receiving in the idle state, a PMU context switch request, and further advancing the FSM to the drain state, draining in the drain state, any pending operation-specific data in the segment, and further advancing the FSM to the stall state, and waiting by the FSM in the stall state to add a wait period and further advancing the FSM to the switch state.

5. The method of claim 4, wherein the operation can be a read or write operation.

6. The method of claim 4 further comprising in the switch state, switching from a current PMU context to a next PMU context.

7. A non-transitory computer readable medium having instructions encoded thereon datapath configuring solutions for reconfigurable dataflow computing systems comprising a coarse-grained reconfigurable (CGR) processor including an array of CGR unit reconfigurable units including a plurality of pattern compute units (PCUs) and a plurality of pattern memory units (PMUs) configured to execute a dataflow graph, a PMU coupled to a PCU via a multi-segment datapath pipeline, the instructions configured to cause a processor to conduct a method comprising:

receiving via a configuration file, PCU configuration data for the PCU, receiving via the configuration file, PMU configuration data for the PMU, configuring a datapath including a plurality of functional units in the PCU using the PCU configuration data to perform a task including a plurality of operations, configuring a plurality of fields in a segment of a multi-segment datapath pipeline corresponding to an operation using a PMU context including a set of configuration bits to activate the segment, switching the plurality of fields in the segment using a plurality of PMU contexts, configuring a finite state machine (FSM) through a plurality of states corresponding to the plurality of PMU contexts, sequentially switching between any two PMU contexts in the segment by switching between their corresponding FSM states, concurrently switching among a plurality of states for a plurality of FSMs corresponding to a plurality of segments to allow switching of PMU contexts in the plurality of segments, wherein the plurality of states include an idle state, a drain state, a stall state, and a switch state, receiving in the idle state, a PMU context switch request, and further advancing the FSM to the drain state, draining in the drain state, any pending operation-specific data in the segment, and further advancing the FSM to the stall state, and waiting by the FSM in the stall state to add a wait period and further advancing the FSM to the switch state.

8. The non-transitory computer readable medium of claim 7 further comprising in the switch state, switching from a current PMU context to a next PMU context.

* * * * *